United States Patent [19]
Fukuda et al.

[11] Patent Number: 5,459,477
[45] Date of Patent: Oct. 17, 1995

[54] DISPLAY CONTROL DEVICE

[75] Inventors: Masao Fukuda; Yoshio Arai, both of Tokyo, Japan

[73] Assignee: Pioneer Electronic Corporation, Tokyo, Japan

[21] Appl. No.: 125,082

[22] Filed: Sep. 22, 1993

Related U.S. Application Data

[63] Continuation of Ser. No. 827,637, Jan. 29, 1992, abandoned.

[30] Foreign Application Priority Data

Jan. 31, 1991 [JP] Japan ................... 3-011317
Jan. 31, 1991 [JP] Japan ................... 3-011318
Jan. 31, 1991 [JP] Japan ................... 3-011320

[51] Int. Cl.$^6$ ............................................. G09G 5/00
[52] U.S. Cl. .................... 345/1; 345/130; 345/138; 382/298
[58] Field of Search ................ 345/1, 127, 130, 345/131, 132, 138; 382/47; 348/383

[56] References Cited

U.S. PATENT DOCUMENTS

| | | | |
|---|---|---|---|
| 3,697,681 | 10/1972 | McCoy | 348/383 |
| 4,129,860 | 12/1978 | Yonezawa et al. | 340/728 |
| 4,257,043 | 3/1981 | Tsuchiko | 340/722 |
| 4,471,348 | 9/1984 | London et al. | 340/722 |
| 4,682,161 | 7/1987 | Bugg | 340/731 |
| 4,725,892 | 2/1988 | Suzuki et al. | 340/728 |
| 4,746,981 | 5/1988 | Nadan et al. | 340/717 |
| 4,761,641 | 8/1988 | Schreiber | 348/383 |
| 4,800,376 | 1/1989 | Suga et al. | 340/721 |
| 4,833,625 | 5/1989 | Fisher et al. | 340/728 |
| 4,924,318 | 5/1990 | Ho | 348/383 |
| 4,965,559 | 10/1990 | Dye | 340/717 |
| 4,988,984 | 1/1991 | Gonzalez-Lopez | 340/728 |
| 5,166,801 | 11/1992 | Yoshikawa | 348/383 |

FOREIGN PATENT DOCUMENTS

| | | | |
|---|---|---|---|
| 0165135 | 9/1984 | Japan | 340/717 |
| 0206392 | 8/1989 | Japan | 340/717 |
| 3246590 | 11/1991 | Japan | 340/717 |

*Primary Examiner*—Richard Hjerpe
*Assistant Examiner*—Lun-Yi Lao
*Attorney, Agent, or Firm*—Kane, Dalsimer, Sullivan, Kurucz, Levy, Eisele and Richard

[57] ABSTRACT

In a display control device according to this invention, video signals are given in parallel each of a plurality of extracting means via a common bus means. For this reason, each extracting means can selectively extract any of the video signals. Each extracting means extracts a portion of or all of required video signals in correspondence to a display area (an area on the display means defined by a display pattern) to be extracted from each of the video signals. The extracted video signals (concretely real luminance signals, interpolated luminance signals, and color signals) are interpolated in horizontal and vertical directions according to a magnification of the display pattern on the display means. This interpolation is an operation to supplement picture elements corresponding to a number of scanning lines and length of the scanning lines which become short when a specified area of the video signal, which is an original signal, is enlarged. The video signals thus interpolated are given to corresponding display units on the display means, respectively. As a result, video signals can be developed at an optional position on the means with an optional size, and in an optional combination.

12 Claims, 23 Drawing Sheets

FIG. 20

| MAGNIFICATION | COEFFICIENT NAME | VERTICAL INTERPOLATION COEFFICIENT | | VERTICAL INTERPOLATION COEFFICIENT | | HORIZONTAL INTERPOLATION COEFFICIENT |
|---|---|---|---|---|---|---|
| | | ODD FIELD | | EVEN FIELD | | |
| ×1 | Ka1<br>Kb1 | 1/1<br>0/1 | | 1/1<br>0/1 | | 1/1<br>0/1 |
| ×2 | Ka2<br>Kb2 | 2/2  2/2<br>0/2  0/2 | | 1/2  1/2<br>1/2  1/2 | | 1/1  1/2<br>0/1  1/2 |
| ×3 | Ka3<br>Kb3 | 3/3  1/3  2/3<br>0/3  2/3  1/3 | | 2/3  3/3  1/3<br>1/3  0/3  2/3 | | 3/3  2/3  1/3<br>0/3  1/3  2/3 |
| ×4 | Ka4<br>Kb4 | 4/4  2/4  4/4  2/4<br>0/4  2/4  0/4  2/4 | | 3/4  1/4  3/4  1/4<br>1/4  3/4  1/4  3/4 | | 4/4  3/4  2/4  1/4<br>0/4  1/4  2/4  3/4 |
| ×5 | Ka5<br>Kb5 | 5/5  3/5  1/5  4/5  2/5<br>0/5  2/5  4/5  1/5  3/5 | | 4/5  2/5  5/5  3/5  1/5<br>1/5  3/5  0/5  2/5  4/5 | | 5/5  4/5  3/5  2/5  1/5<br>0/5  1/5  2/5  3/5  4/5 |
| ×6 | Ka6<br>Kb6 | 6/6  4/6  2/6  6/6  4/6  2/6<br>0/6  2/6  4/6  0/6  2/6  4/6 | | 5/6  3/6  1/6  5/6  3/6  1/6<br>1/6  3/6  5/6  1/6  3/6  5/6 | | 6/6  5/6  4/6  3/6  2/6  1/6<br>0/6  1/6  2/6  3/6  4/6  5/6 |
| ×7 | Ka7<br>Kb7 | 7/7  5/7  3/7  1/7  6/7  4/7  2/7<br>0/7  2/7  4/7  6/7  1/7  3/7  5/7 | | 6/7  4/7  2/7  7/7  5/7  3/7  1/7<br>1/7  3/7  5/7  0/7  2/7  4/7  6/7 | | 7/7  6/7  5/7  4/7  3/7  2/7  1/7<br>0/7  1/7  2/7  3/7  4/7  5/7  6/7 |
| ×8 | Ka8<br>Kb8 | 8/8  6/8  4/8  2/8  8/8  6/8  4/8  2/8<br>0/8  2/8  4/8  6/8  0/8  2/8  4/8  6/8 | | 7/8  5/8  3/8  8/8  7/8  5/8  3/8  1/8<br>1/8  3/8  5/8  7/8  1/8  3/8  5/8  7/8 | | 8/8  7/8  6/8  5/8  4/8  3/8  2/8  1/8<br>0/8  1/8  2/8  3/8  4/8  5/8  6/8  7/8 |

DISPLAY CONTROL DEVICE

This application is a continuation, of application Ser. No. 07/827,637, filed Jan. 29, 1992, now abandoned.

BACKGROUND OF THE INVENTION

This invention relates to a display control device which controls display of input video signals, and particularly to a display control device which controls display according to various types of display formats.

In recent years, as a display system for various types of demonstration in a studio or a theater, a multivision system is well known. The multivision system is a large size display system which allows various types of display patterns such as displaying a large size video image on a large screen formed by combining a plurality of display units, each based on a projection TV system, in both vertical and horizontal directions, as providing a screen comprising multiple blocks each having multiple display units to display several different video images on the screen, or as displaying different video images on each display unit.

Development of various types of display patterns on the display system as described above is controlled by a display control device called a multi-video processor. The display patterns are largely classified to a single screen on which the same video image is displayed by each display unit, and an enlarged screen on which a large video image is displayed by using particular ones or all of the display units.

Thus, in controlling display of an enlarged video image, as the video image is enlarged in both vertical and lateral directions by the same magnification, a ratio of vertical length vs lateral length is kept at a constant level, so that the enlarged video image is a similar figure to the original video image. Also, as video signals are input to a display pattern control device through one channel, a similar display pattern is provided. Thus, with the conventional technology, it is difficult to display different modes of video images (based on different combination of positions and size) in various patterns. Also, if a frame of a video image is adjusted in a particular display unit by an arbitrary magnification, other frames not requiring adjustment are also changed, and continuity of video images over multiple display units adjacent to each other is lost, thus displacement of display being generated in each display unit.

Furthermore, also in a display system comprising a single display unit, when it is necessary to display a video image in an enlarged form, display control is performed by interpolating input video signals to increase the density of picture elements. This display control by means of interpolation is based on an interlace scanning system wherein even number fields are scanned after scanning odd number fields, and interpolation scan signals are generated at scanning line positions in even number fields depending on scan signals in odd number fields when scanning the odd number fields. Thus, the picture quality is kept at a constant level by raising the density of picture elements by means of interpolation.

In the display control by means of interpolation, however, linear interpolation is made at a particular ratio prescribed beforehand to raise the density of picture elements. If this method is applied to enlarge a video image in vertical and horizontal directions at an optional magnification, respectively, also the interporaltion ratio becomes identical, and sometimes the density of picture elements in the enlarged display may be insufficient, excluding the special cases where the number of points for interpolation is suited to the magnification or the number of increased scanning lines is suited to the magnification especially in case of enlargement in the vertical direction, good resolution can not be obtained. Also, if the conventional technology is applied to a multivision system having multiple display units wherein a video image is provided in each of the display units at a different magnification, respectively, the density of picture elements varies from display unit to display unit, so that display at a homogeneous display can not be performed.

SUMMARY OF THE INVENTION

A purpose of this invention is to provide a display control device which can display video signals input through multiple channels at an optional position on a display screen with an optional size, and in optional combinations.

To achieve this purpose, a display control device according to this invention has a configuration wherein the display control device comprises a display means to display one or a plurality of video images in optional display patterns according to multiple input video signals, an extraction means to select any from the multiple input video signals and extract a portion of the selected input video signal corresponding to a particular display field of the display means, an enlargement interpolation means to enalrge and interpolate each portion of the extracted video signals in horizontal and vertical directions according to a magnification of each portion at which the portion of the extracted video signals is displayed on a display screen of the display means and output the enlarged and interpolated video signals to each of the display units, respectively, and a common bus means to parallelly supply all of the multiple input video signals to each of the extraction means.

Another purpose of this invention is to propose a display control device which adjusts video image positions to maintain continuity of video images in multiple display arears adjacent to each other when displaying video images having different magnifications in multiple display areas adjacent to each other. To achieve this purpose, the display control device according to this invention has a configuration, wherein the display control means has a storage means in which input video signals for original pictures are stored according to write signals for said original pictures and from which said stored input video signals are read according to display read signals, a display means which comprises multiple display areas adjacent to each other and provides displays according to video signals read from the storage means, a video image position adjustment data storage means to store multiple pieces of video image position adjustment data corresponding to each display format for display in multiple display units in a format which is the same as or different from the display format of the original picture, and a video image position signal generating means to read picture adjustment data corresponding to a display format select signal which selects display format for the display means from multiple pieces of video image position adjustment data storage means and perform fine adjustment of a video image position by generating a read signal for the display depending on the video image position adjustment data.

A still further purpose of this invention is to propose a display control device which can perform display control for linear interpolation suited to various magnifications by generating interpolation coefficients corresponding to the various magnifications. To achieve this purpose, the display control device according to this invention has a configuration, wherein said display control device has a linear interpolation coefficient generating means to generate a linear interpolation coefficient linearly specifying a weight, in interpolating a new picture element between particular picture elements specified by an input video signal for the original picture, for each of picture elements adjacent to the new picture element to be interpolated, video signal processing means to linearly interpolate an input video signal according to the linear interpolation coefficient and to output an interpolated output video signal, and a display means to display the output video signal in a format which is the same as or different from the input video signal.

BRIEF DESCRIPTION OF THE DRAWINGS

In the accompanying drawing;

FIG. 20 is a table of read values for vertical and horizontal interpolation coefficients in the embodiment shown in FIG. 17;

DETAILED DESCRIPTION OF THE PREFERRED EMBODIMENT

Figure 1:
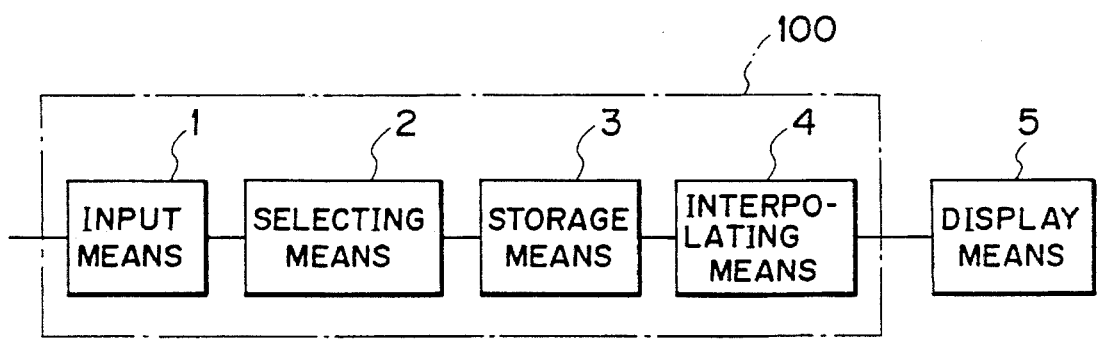
FIG. 1 is a general entire block diagram of a display control device according to this invention.

Description is made hereinunder for each embodiment shown in the drawings. To make it easier to understand the description, description is made below for outline of a display control device as a bases for this invention and an outline of a multivision system.

OUTLINE OF DISPLAY CONTROL DEVICE

FIG. 1 is a general block diagram for a display control device which is a basis for this invention. In this figure, the display control device 100 has an input means 1 to input video signals input from outside into the device, a selecting means 2 to select a video signal, if multiple video signals are input by the input means 1, a storage means 3 to store the selected video signal, and an interpolating means 4 to read and interpolate the stored video signal. The device 100 performs display control by providing output of tile interpolated video signal to a display means 5.

The input means 1 executes various types of processes including synchronization of a video signal with a reference signal on the side of the device when the video signal is input. The selecting means 2 executes various types of processing, in addition to selecting a video signal to be displayed on the display means 5 from the multiple input video signals, such as selecting and distributing each video signal to each display unit corresponding to each video signal when the display means 5 comprises a plurality of multiple display units. The storage means 3 comprises a frame memory or a field memory, and stores data to be displayed on the display means 5. The interpolating means 4 interpolates a video signal to raise the density of picture elements when displaying a video image on the display means 5 in an enlarged form.

OUTLINE OF MULTIVISION SYSTEM

Figure 2:
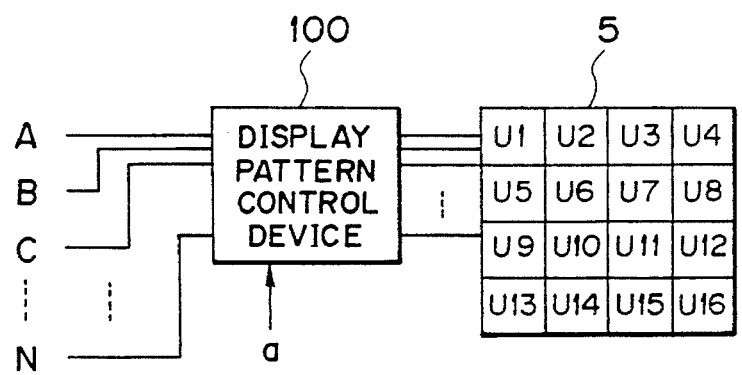
FIG. 2 is a block diagram of a multivision system to which this invention is applicable.

FIG. 2 is a general block diagram of a multivision system to which this invention is applicable. As shown in FIG. 2, multiple video signals A to N are input to the display control device 100. The display control device 100 selects and synthesizes the input video signals A to N according to a display pattern speficied by a screen control signal a, and outputs video signals specifying the display position of a video image to be displayed on the video image display device 5 and the size of the video image to each of the display units U1 to U16 of the video image display device 5, respectively. The video image display device 5 displays input video signals on each of the display units U1 to U16 thereby to display a video image in an optional display pattern specified by the screen control signal a on a screen comprising the display units U1 to U16.

The input video signals A to N are individually entered from a plurality of input source equipments. As an input source equipment, such a device as an LVD (Laser Vision Disk) player, a BS (broadcasting satellite) tuner, a TV (television) tuner, a video camera, a character generator, or a character multiplex tuner can be connected. Note that the input video signals A to N from these input source equipments are not synchronized to each other, and a process for synchronizing them is described later.

The display control device 100 comprises microprocessors and its detail is described later.

The video image display device 5 comprises totally 16 pieces of display units U1 to U16 arranged in the form of 4 (in vertical direction )×4 (in lateral direction). Each of the display units U1 to U16 is a display unit which is a so-called projection TV system wherein projectors for three elementary colors R, G, and B incorporated therein project light onto a project screen comprising Flesnel lenses to display a video image. Note that, if necessary, this invention is applicable to a video image display device wherein CRTs (Cathode Ray Tubes) or liquid crystal displays are combined similarly.

OUTLINE OF A FIRST EMBODIMENT OF THIS INVENTION

Figure 3:
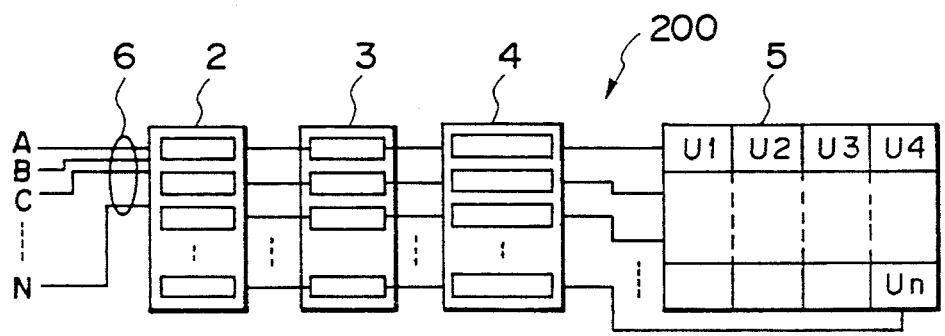
FIG. 3 is an illustration showing a principle of a first embodiment of this invention.

FIG. 3 is an illustration for a principle of a first embodiment of this invention. In this drawing, a display control device 200 provides a display control so that one or multiple video images are displayed in an optional display pattern according to multiple input video signals A to N on a display screen of the video image display device 5 comprising multiple display units U1 to U16, each of which is independent of each other and combined for instance in vertical and lateral directions. The display control device 200 has a selecting means 2 to extract and select video signals corresponding to display areas from the input video signals A to N, a storage means 3 to store the selected video signals, an interpolating means 4 to read out the stored video signals to interpolate the signals in both horizontal and vertical directions according to magnification on a display screen of the video image display device 5 thereby to output the enlarged and interpolarated video signals to each of the display units U1 to Un, respectively, and a common bus means 6 to supply in parallel all of the multiple input video signals A to N to each of the selecting means 2.

According to the principle of the first embodiment, the input video signals A to N are given in parallel to the multiple selecting means 2 via the common bus means 6. For this reason, each of the selecting means 2 can select any of the video signals A to N and extract any portion of the video signal selected from the video signals A to N. Each selecting means 2 selectively extracts a part or all of the video signals A to N corresponding to display areas to be extracted (or in other words, areas on the display means 100 determined by the display pattern) from the video image signals A to N and stores the extracted signals in the storage means 3. These stored signals (concretely, real luminance signal $Y_R$, interpolated luminance signla $Y_I$, color signal $C_R$) are enlarged and interpolated in horizontal and vertical directions by a plurality of interpolating means 4 according to a magnification of a display pattern on the video image display device 5. This interpolation is made to supplement picture elements corresponding to the number of scanning lines and the length of scanning lines which become short when specified areas for input video signals A to N, which are original signals, are enlarged. The video signals thus interpolated are given to the corresponding display units U1 to Un on the video image display device 5, respectively. As a result, it becomes possible to develop the input video signals A to N at optional positions with optional sizes on the video image display device 5.

The number of the selecting means may be the same as that of the display units U1 to Un constituting the video image display device 5. As the number of selecting means 2 is the same as that of the display units U1 to Un, the selecting means extracts each of video signals to be displayed in each of display units U1 to Un in the form of 1 vs 1. With this feature, signal processing is simplified, and it becomes easier to develop a display pattern on the video image display device 5.

Also, in correspondence to each of the display units U1 to Un, the same number of the interpolating means 4 as that of said display units U1 to Un may be arranged. As the same number of interpolating means 4 as that of the display units U1 to Un are arranged, each of the input video signals A to N to be displayed in each of the display units U1 to Un is enlarged and interpolated in the form of 1 vs 1. With this, signal processing is simplified, and it becomes easier to develop a display pattern on the video image display device 5.

AN EXAMPLE OF THE FIRST EMBODIMENT OF THIS INVENTION

Figure 4:
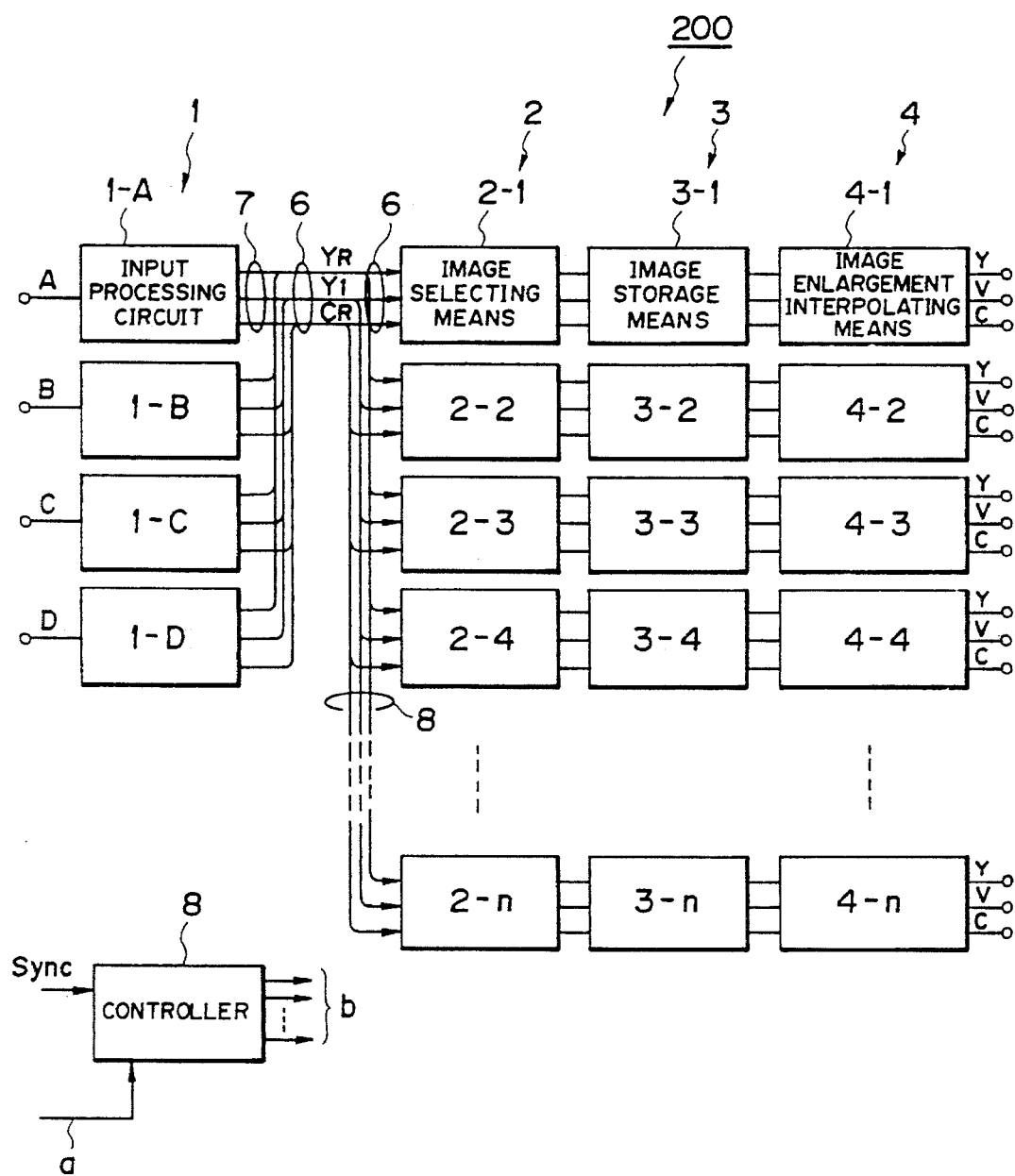
FIG. 4 is a block diagram of a display pattern control device in a concrete example of a first embodiment.

Description is made below for a preferred example of a display control device according to the first embodiment. FIG. 4 is a block diagram of an example of the first embodiment. In this figure, the display pattern control device 200 has a plurality of input processing circuits 1-A to 1-D, each corresponding to each of a plurality (4 pieces in FIG. 4) of input video signals A to D in the form of 1 vs 1. The input processing circuits 1-A to 1-D are connected to the video image selecting means 2-1 to 2-n via local buses 7 and a common bus 6. The video image selecting means 2-1 to 2-n are arranged in correspondence to the display units U1 to U16 of the video image display device 5 in the form of 1 vs 1. For this reason, in the embodiment, the n is 16. The video image selecting means 2-1 to 2-n are connected to the video image enlargement interpolating means 4-1 to 4-n arranged in correspondence to the display units U1 to U16 of the video image display device 5 in the form of 1 vs 1 via the video image storage means 3-1 to 3-n. Each of output terminals for the video image enlargement interpolating means 4-1 to 4-n is connected to a corresponding display unit of display units u1 to Un of the video image display device 5, respectively. A controller 8 is a device to control each of the elements described above according to an instruction by a screen control signal a, and outputs a circuit control signal b generated depending on a synchronizing signal Sync and the screen control signal a to each element.

Each of the input processing circuits 1-A to 1-D has the same configuration, and has a synchronizer, a Y/C separator, and an input interpolating circuit, respectively. The synchronizer synchronizes each of the video signals A to D with each other. In other words, as described above, each of the input video signals A to D is input from a separate and independent input source equipment, respectively, so that they have not been synchronized with each other, nor with the screen display means 2. If they are input to the video image selecting means 2-1 to 2-n as they are, a high quality video image can not be obtained. So, with this synchronizer, each of the input video signals A to D is synchronized with each screen display means 5.

The Y/C separator separates signals into Y signals (luminance signals) and C signals (color signals) when interpolating with an input interpolating circuit which is described hereafter.

The input interpolating circuit is used to previously make higher the density of picture elements for the purpose of preventing the density of picture elements from becoming rougher due to decrease of the number of scanning lines and their length due to a processing for enlargement in which the input video signals A to D are enlarged by the video image selecting means 2-1 to 2-n described hereafter and the video image enlargement interpolating means A to D. For this reason, the input processing circuits 1-A to 1-D also output interpolated data, respectively. The data comprises the real luminance signal $Y_R$ which is a Y signal contained in the original signal, the interpolated luminance signal $Y_1$, and the color signal $C_R$ contained in the original signal. Thus, as the interpolated luminance signal $Y_I$ is generated, the number of scanning lines seemingly increases by 2 times.

A local bus 7 transmits digital data for the real luminance signal $Y_R$, the interpolated luminance signal $Y_I$, and the color signal $C_R$. If it is assumed that 8 bits are allocated to each of the real luminance signal $Y_R$, the interpolated luminance signal $Y_I$, and the color signal $C_R$, the local bus 7 comprises 8 bits×3= totally 24 scanning lines. Each local bus 7 is connected to the common bus 6.

The common bus 6 sends signals for the real luminance signal $Y_R$, the interpolated luminance signal $Y_1$, and the color signal $C_R$ from each local bus 7 in parallel to the video image selecting means 2-1 to 2-n, and comprises 8 bits× 4=32 lines for the real luminance signal $Y_R$, similarly 32 lines for the interpolated luminance signals $Y_1$, and 32 lines for the color signal $C_R$, or totally 32×3=96 lines. Thus the common bus is connected in parallel to each of the video image selecting means 2-1 to 2-n, so that each of the video image selecting means 2-1 to 2-n can select any of the input video signals A to D. As a result, for instance, all of the video image selecting means 2-1 to 2-n can select the input video signal A, or can select any of the input video signals A to D in an optional combination, which means that free selection can be executed.

Figure 5:
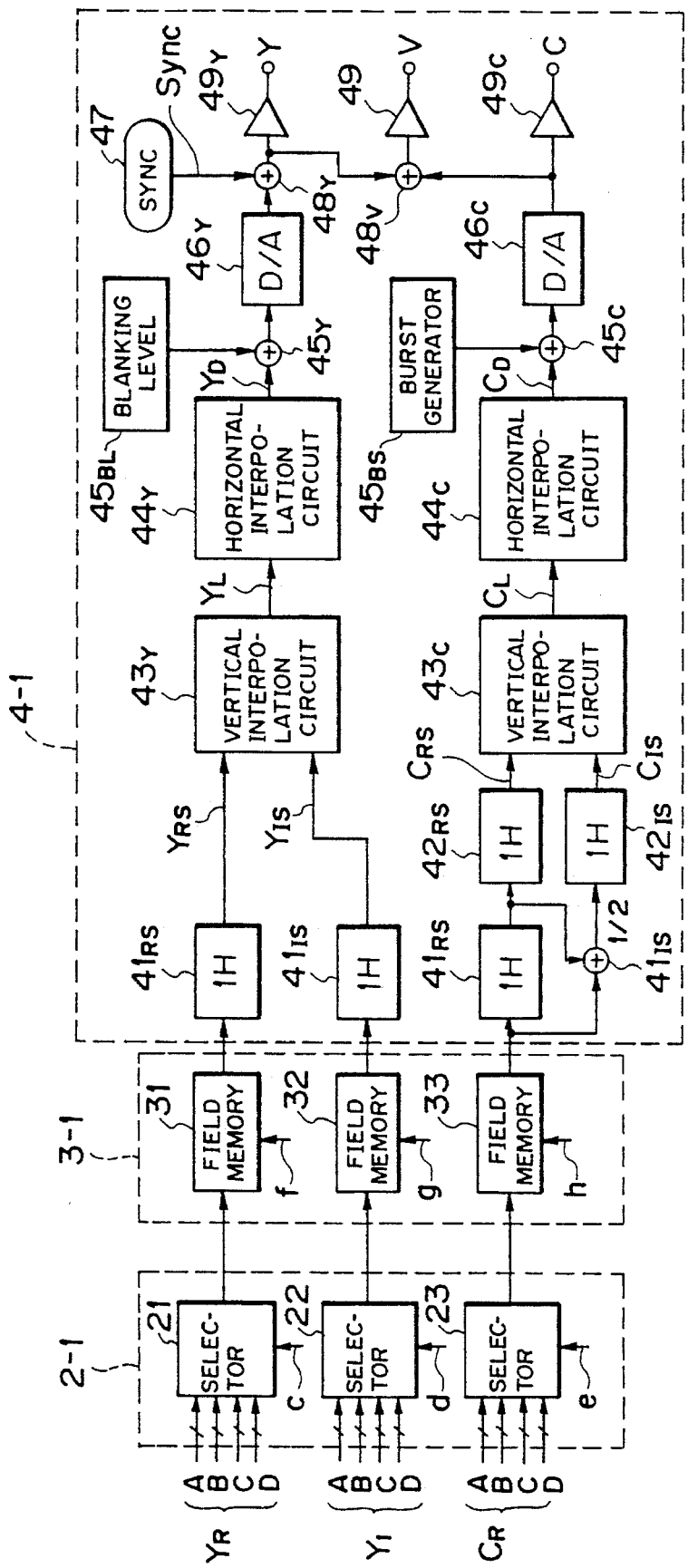
FIG. 5 is a detailed block diagram of an video image selecting means and an video image enlargement interpolation means.

Then, description is made below for details of the video image selecting means 2-1 to 2-n, the video image storage means 3-1 to 3-n, and the video image enlargement interpolating means 4-1 to 4-n with reference to FIG. 5. Note that each of the video image selecting means 2-1 to 2-n has the same configuration in terms of hardware, so description is made in FIG. 5 for the video image selecting means 2-1 as a representative example. This is also true in descriptions for the video image storage means 3-1 to 3-n and the video image enlargement interpolating means 5-1 to 5-n.

The video image selecting means 2-1 has 3 selectors 21, 22, and 23 corresponding to the real luminance signal $Y_R$, the interpolated luminance signal $Y_I$ and the color signal $C_R$. The video image storage means 3-1 has three field memories 31, 32, and 33 to separately store output data from the selectors 21, 22 and 23, respectively. To the selector 21 are input real luminance signals $Y_R$ (each is 8-bit data) for the input video signals A to D, and the selector 21 selects any one of the input signals A to D according to the video image select signal c. To the selector 22 are input the luminance signals $Y_I$, each interpolated to each of the video signals A to D, and the selector 22 selects any one of the interpolated luminance signals $Y_I$ for the input video signals A to D according to an video image select signal d. To the selector 23 are input each of the color signals $C_R$ (8-bit data, respectively) for the input video signals A to D, and the selector 23 selects any one of color signal $C_R$ for the input video signals A to D according to a video image select signal e. The field memory 31 stores a part of the real luminance signal $Y_R$, selected by the selector 21, to be displayed in the display units according to a read/write enable signal f. Similarly, the field memory 32 stores a part of the interpolated luminance signal $Y_I$, selected by the selector 22, to be displayed in the display units according to a read/write enable signal g. Similarly, the field memory 33 stores a part of the color signal $C_R$, selected by the selector 23, to be displayed in the display units according to a read/write enable signal h. If the capacity allows, the field memories 31, 32, and 33 may be used as frame memories.

Figure 6:
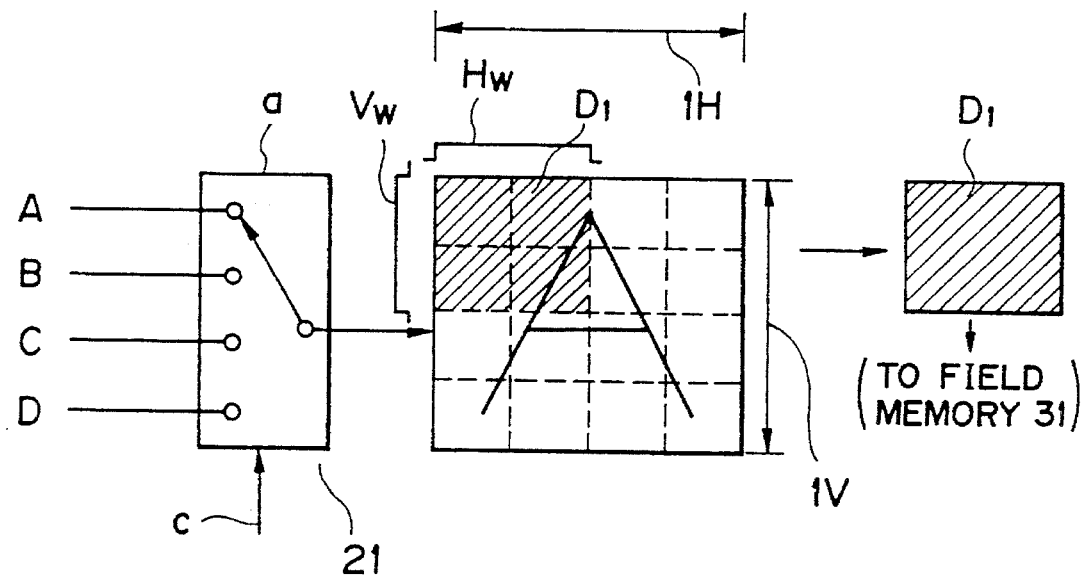
FIG. 6 is an illustration of a selector's function.

FIG. 6 is an illustration of functions of the selector 21. The selector 21 selects and outputs any of the input video signals A to D according to the video image select signal c. Only a separated video image data $D_1$ for an area specified by a separate pulse $H_W$ in a horizontal direction and a separate pulse $V_W$ in a vertical direction contained in the read/write enable signal f to take out a part of an video image is sent to the field memory 31. The separate pulse $H_w$ is a part of one horizontal scanning period 1H for an original input video signal and the separate pulse $V_w$ is a part of one vertical scanning period 1 V for the original input video signal. For this reason, by setting time width and timing for the horizontal direction separate pulse $H_W$ and the vertical direction separate pulse $V_W$ in accordance with the control signal a (FIG. 4) with a controller 8, video image data in an optional position can be extracted with an optional size. Data read from the field memory 31 is controlled not depending on a width for separation, that is, the number of picture elements written in, but by spending a time for 1 field. For this reason, the narrower the separation width is, or the higher the magnification is, the more roughly the data is read. That is, a space between adjacent picture elements becomes large.

The video image enlargement interpolating means 4-1 includes a system to interpolate a luminance signal, a system to interpolate a color signal, and a system to generate an output luminance signal Y, an output color signal C, or a video signal V. In the system to interpolate a luminance signal, a real luminance signal $Y_R$ read from the field memory 31 is delayed by 1 H by a 1 H delay circuit $41_{RS}$, and the delayed luminance signal $Y_{RS}$ is input to a vertical interpolation circuit $43_Y$. On the other hand, an interpolated luminance signal $Y_I$ read from the filed memory 32 is delayed by 1 H by a 1 H delay circuit $41_{IS}$, and the delayed luminance signal $Y_{IS}$ is input to the veritcal interpolation circuit $43_Y$. The vertical interpolation circuit $43_Y$ deduces luminance data for the scanning lines between the delayed luminance signal $Y_{RS}$ and the delayed luminance signal $Y_{IS}$ by multiplying the delayed luminance signal $Y_{RS}$ and the delayed luminance signla $Y_{IS}$ by a specified coefficient to generate a vertically interpolated luminance signal $Y_L$ for newly interpolated scanning lines. Then, the vertically interpolated luminance signal $Y_L$ is input to a horizontal interpolation circuit $44_Y$. The horizontal interpolation circuit $44_Y$ deduces picture element data between picture element data adjacent to each other by synchronizing with a system clock ($4f_{SC}$) which is a frequency 4 times higher than a color sub-carrier and is a sampling frequency, on the basis of the neighboring picture element data in the vertically interpolated luminance signal $Y_L$ thereby to generate a horizontally interpolated luminance signal $Y_D$ which is newly interpolated picture element data. To this horizontally interpolated luminance signal $Y_D$ is added a blanking signal from a blanking level generator $45_{BL}$ in an adder $45_Y$, and converted to an analog signal by a D/A converter $46_Y$. In an adder $48_Y$, sync. signals of $H_{sync}$ and $V_{sync}$ are added to the the added signal is converted luminance signal, which is sent to a driver $49_Y$. The driver $49_Y$ amplifies the luminance signal thus enlarged and interpolated, and outputs it as an output luminance signal Y.

Then, in the system to interpolate the color signal $C_R$, the color signal $C_R$ read from the field memory 33 is converted to a delayed color signal $C_{RS}$ and a delayed color signal $C_{IS}$ through 1 H Delay circuits $41_{RS}$, $41_{IS}$, $42_{RS}$, and $42_{IS}$, and input to a vertical interpolation circuit $43_C$. The vertical interpolation circuit $43_C$ generates a vertically interpolated color signal $C_L$ for the scanning lines between the delayed color signal $C_{RS}$ and the delayed color signal $C_{IS}$ on the basis of the delayed color signal $C_{JS}$ and the delayed color signal $C_{IS}$. Then, the vertically interpolated color signal $C_L$ is input to a horizontal interpolation circuit $44_C$. The horizontal interpolation circuit $44_C$ generates a horizontally interpolated color signal $C_D$ by adjusting an interval between neighboring picture element data in the vertically interpolated color signal $C_L$ so as to match a frequency form of the specified color sub-carrier. A color burst signal from a burst generator $45_{BS}$ is added in the adder $45_C$ to the horizontally interpolated color signal $C_D$, which is then converted to an analog signal by a D/A converter $46_C$. A driver $49_C$ amplifies the color signal thus enlarged and interpolated, and outputs as an output color signal C. On the other hand, an output signal from the adder $48_Y$ and an output signal from the D/A converter $46_C$ are added in an adder $48_V$, amplified by a driver $49_V$, and output as an output video signal V.

Thus, the enlarged and interpolated output luminance signal Y and the output color signal C or the output video signal V are given to the display unit U1. The display unit U1 displays a video image comprising the given output luminance signal Y and the output color signal C or the output video signal V.

GENERAL OPERATIONS OF AN EXAMPLE OF THE FIRST EMBODIMENT

Figure 7:
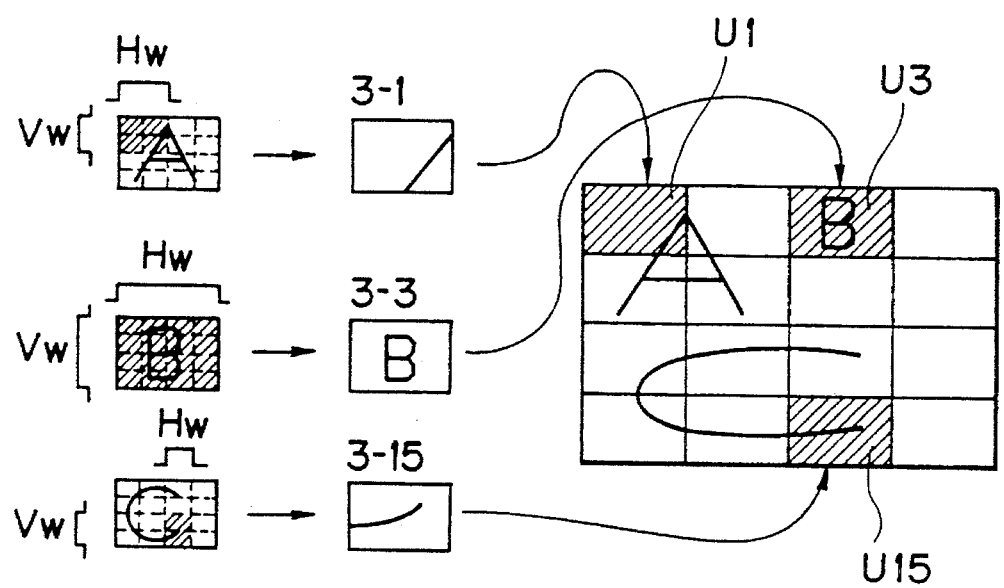
FIG. 7 is an illustration showing general operations of this invention.

Then, description is made below for general operations of the first embodiment. Let us assume that the input signals A to C are processed by the input processing circuits 1-A to 1-C (FIG. 4), and the luminance signal $Y_R$ for the input video signals A to C are input to the selector 21 (FIG. 5 and FIG. 6). The selector 21 selects the input video signal A depending on the video image select signal c and separates or takes out the real luminance signal $Y_R$ corresponding to an area, as shown in FIG. 7 in accordance with the principle shown in FIG. 6. In other words, the selector 21 sets the horizontal direction separate pulse $H_W$ and the vertical direction separate pulse $V_W$ for the input video signal A as "A" in FIG. 7, extracts a portion corresponding to the display unit U1, and writes it in the field memory 31. Also for the input video signal B, the selector 23 sets the horizontal direction separate pulse $H_W$ and the vertical direction separate pulse $V_W$ for all areas as "B" in FIG. 7, and extracts a portion corresponding to the display unit U3. Further, for the input video signal C, the selector 15 sets the horizontal direction separate pulse $H_W$ and the vertical direction separate pulse $V_W$ as "C" in FIG. 7, and extracts a portion corresponding to the display unit U15. The above descriptions relate to the display unit U1, U3, and U15, and also for other display units, the selector for each of the display units separates the real luminance signal $Y_R$ for the corresponding section. And, also for the color signal $C_R$, the operation as described above is performed, and the color signal $C_R$ for a necessary area is extracted. The real luminance signal $Y_R$, interpolated luminance signal $Y_1$, and the color signal $C_R$ extracted are enlarged and interpolated by the video image enlargement interpolating means, and various types of video images as shown in FIG. 7 are simultaneously displayed.

Figure 8A:
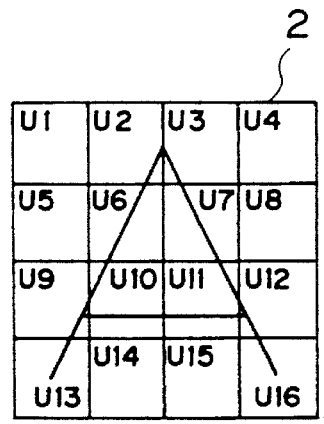
FIGS. 8(A) to 8(F) are illustrations of an example of display patterns according to this invention.
Figure 8B:
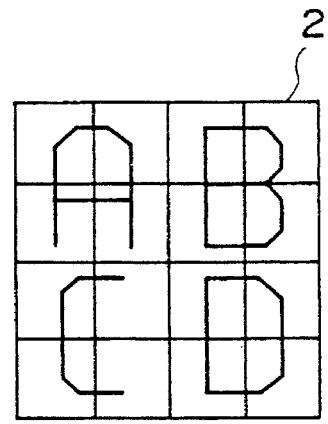
Figure 8C:
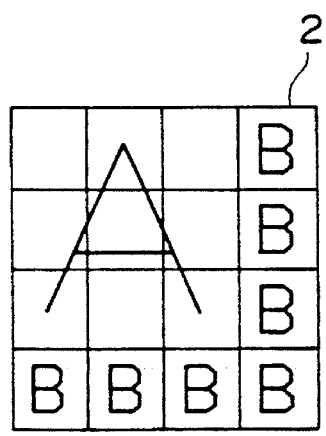
Figure 8D:
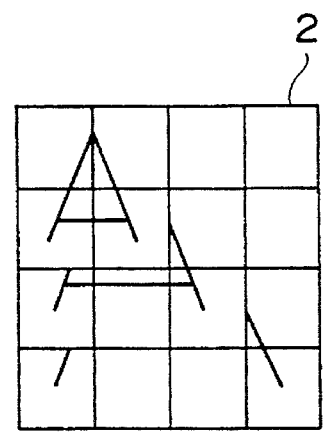
Figure 8E:
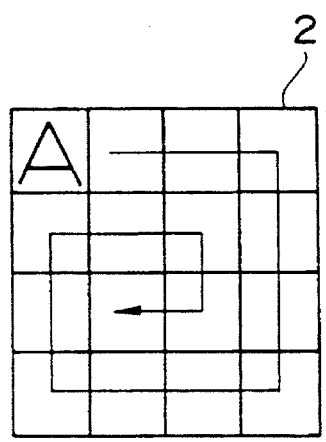
Figure 8F:
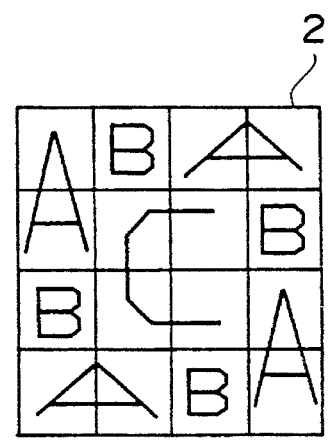

Examples of display pattern controlled according to this invention are shown in FIGS. 8(A) to 8(F). FIG. 8(A) shows an example where the input video signal A are displayed using all of the display units U1 to U16. FIG. 8(B) shows an example wherein the display units U1 to U16 are divided into 4 blocks and the input video signals A to D are displayed in each block, FIG. 8(C) shows an example wherein only the input video signal A is enlarged and the video signal B is displayed at the same magnification as that of the original video image, FIG. 8(D) shows an example wherein the input video image A is displayed, being multiplexed at various magnifications, FIG. 8(E) shows an example where the display units are switched sequentially to move the video image in a spiral form, and FIG. 8(F) shows an example having the best effect of this invention wherein one video image (input video signal A) are displayed at various magnifications in both vertical and lateral directions to form various display patterns.

Although the number of display units is 16 in the embodiment, the video image display device may comprise other number of screens. Also, the interpolated luminance signal $Y_1$ is generated in the input processing circuit, but generation of the interpolated luminance signal $Y_1$ is not always required, and in this case the number of buses may be 8×2×4=64 buses.

As described above, in this invention, a plurality of video signals are given in parallel to a plurality of extracting means via a common bus, video signals for required display areas are extracted independently by each extracting means for each input video signal, and the extracted video signal are enalrged and interpolated individually, so that an optional video image can be displayed at an optional position of the screen of the display means with an optional size, and in optional combination. Thus, various display patterns are provided.

OUTLINE A SECOND EMBODIMENT OF THIS INVENTION

Figure 9:
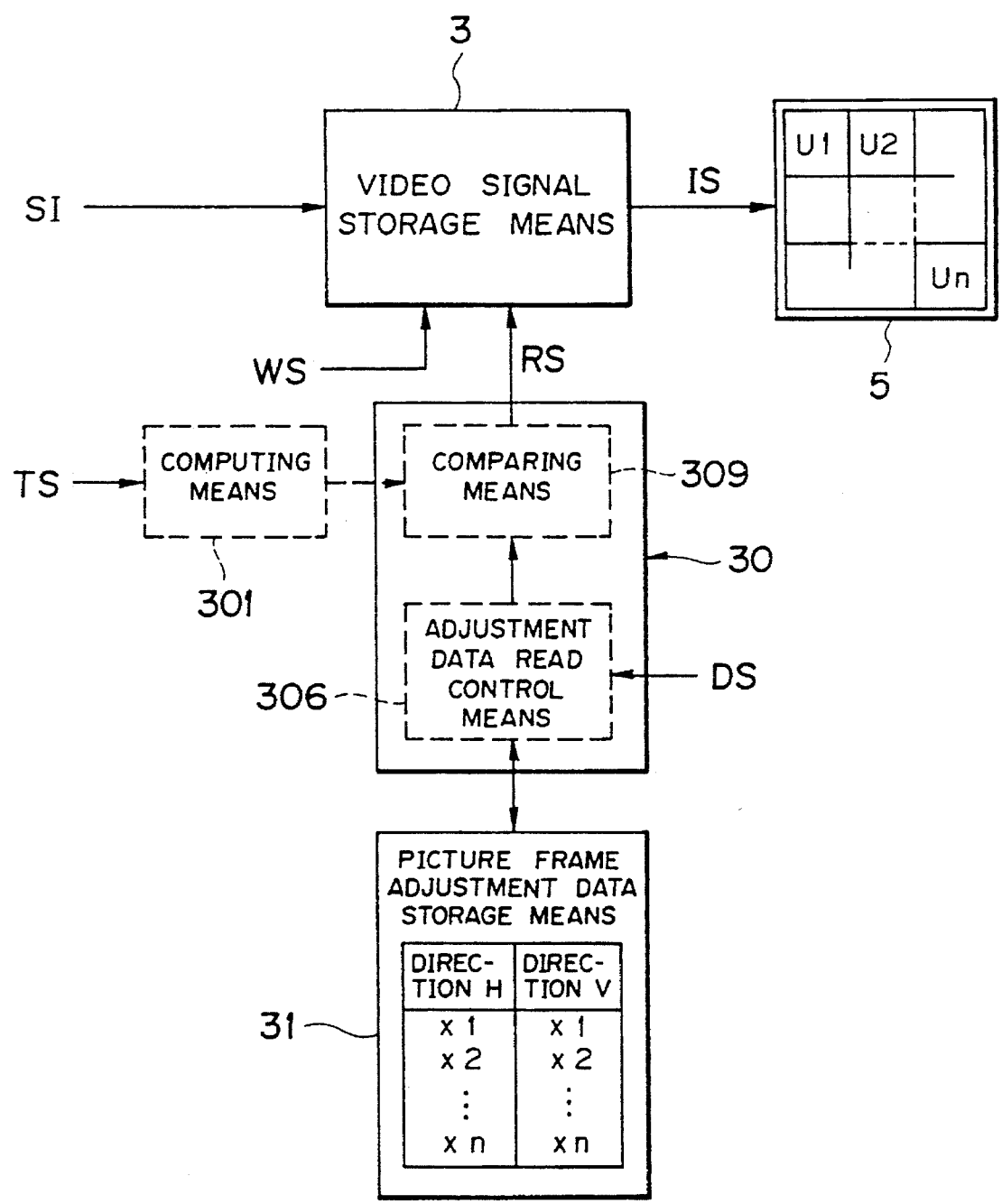
FIG. 9 is an illustration of a principle of a second embodiment of this invention.

FIG. 9 shows a principle of a second embodiment of this invention. In this figure, a display control device according to a principle of the second embodiment stores input video signals SI for a original picture in an video signal recording means 3 according to a write signal $W_S$ for the original picture, reads the stored video signals SI according to a read signal $W_R$ for display, and displays the read video signal SI on the video image display device 5 comprising a plurality of display units U1 to Un (n is an integral number of 2 or more) adjacent to each other in the same format or different formats while maintaining correlations. The display control device, wherein the display on the video image display device 5 is provided by adjusting a video image position in each of the display units U1 to Un, has a video image position adjustment data storage means 31 to store a plurality of video image position adjustment data (x1–xn) for displaying the video image in the format which is the same as or different from the format of the original picture, and a video signal generating means 30 to read by an adjustment data control means 306, video image position adjustment data corresponding to a display format select signal $D_S$ from the plurality of video image position adjustment data stored in the video image position adjustment data storage means 31 to generate a read signal $R_S$ for the display depending on the video image position adjustment data, and to perform fine adjustment of the video image position. The read signal $R_S$ is generated so that a comparing means 309 compares a frame adjustment data with a signal output from a counter 301 as computing means into which a timing signal TS for an original picture is input.

According to the invention based on the principle shown in the second embodiment, a plurality of video image position adjustment data are stored in the video image position adjustment data storage means 31 in correspondence with each display format, respectively, a corresponding video image position adjustment data according to a display format select signal are read from a plurality of video image position adjustment data, a read signal to read a video signal according to the read video image position adjustment data is generated by a video signal generator 30, and an video signal specified by this read signal and stored in the video signal storage means 31 is read and displayed on the video image display device 5. As the read signal is generated according to the video image position adjustment data corresponding to each display format, in any display format, continuity of a video image over a plurality of neighboring display units is not lost in the display.

A CONCRETE EXAMPLE OF THE SECOND EMBODIMENT OF THIS INVENTION

Description is made below for a perferred concrete example of a display control device according to the second embodiment. To make it easier to understand the preferred concrete example, a conventional display control device as a basis for the second embodiment is described below with reference to FIG. 10 to FIG. 12.

Figure 10:
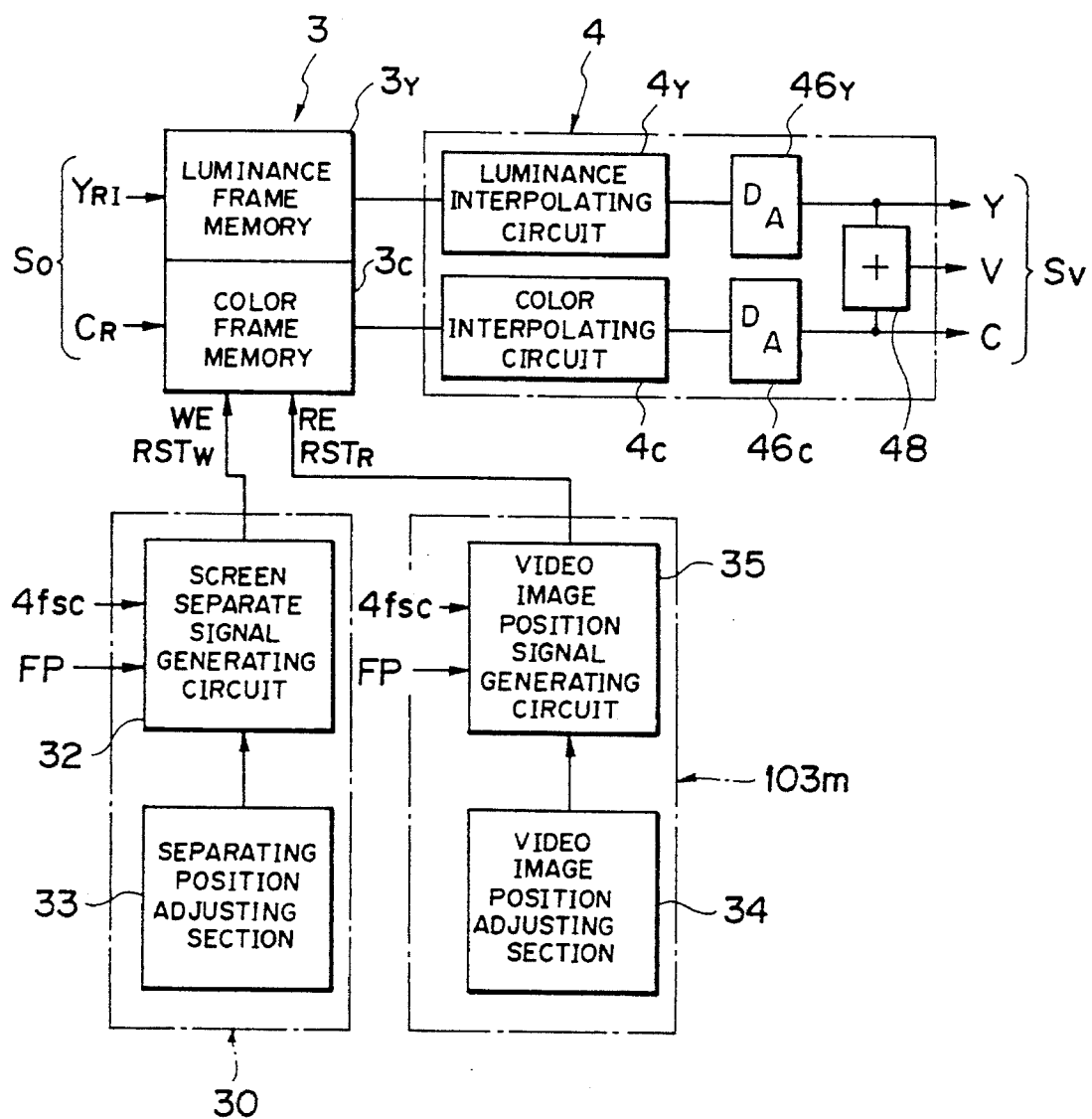
FIG. 10 is a block diagram equivalent to one screen of a conventional video image display device as a basis for the second embodiment of this invention.

In FIG. 10, the conventional display control device has a frame memory 3 to store a luminance signal $Y_I$ and a color signal $C_R$ for an input video signal $S_O$ of an original picture input from outside, a rough adjustment circuit 30 to generate a memory write signal WE and a write reset signal $RST_W$ for making it possible to write the input video signal $S_O$ in this frame memory 3 on the basis of a system clock $4f_{SC}$ which has a 4 times higher frequency than that of a color subcarrier of the input video signal $S_O$ and to adjust positions for separating or taking out input video signals according to each magnification, a fine adjustment circuit 3m to generate a memory read signal RE and a read reset signal $RST_R$ for the frame memory 3 at a moving interval (moving sampling interval) common to each magnification according to the system clock $4f_{SC}$ and a frame pulse FP, and an interpolation circuit 4 to interpolate the read video signal according to the memory read signal RE and the read reset signal $RST_R$, to perform digital/analog (D/A) conversion for the interpolated video signal and to output a display video signal $S_V$ as an luminance signal Y, a color signal C, or a video signal V.

Figure 11:
FIG. 11 shows a sampling point format during one horizontal scanning period at multiple magnifications, wherein (A) is an illustration of sampling points for a frame memory and (B) is an illustration of sampling points after interpolation.
Figure 12:
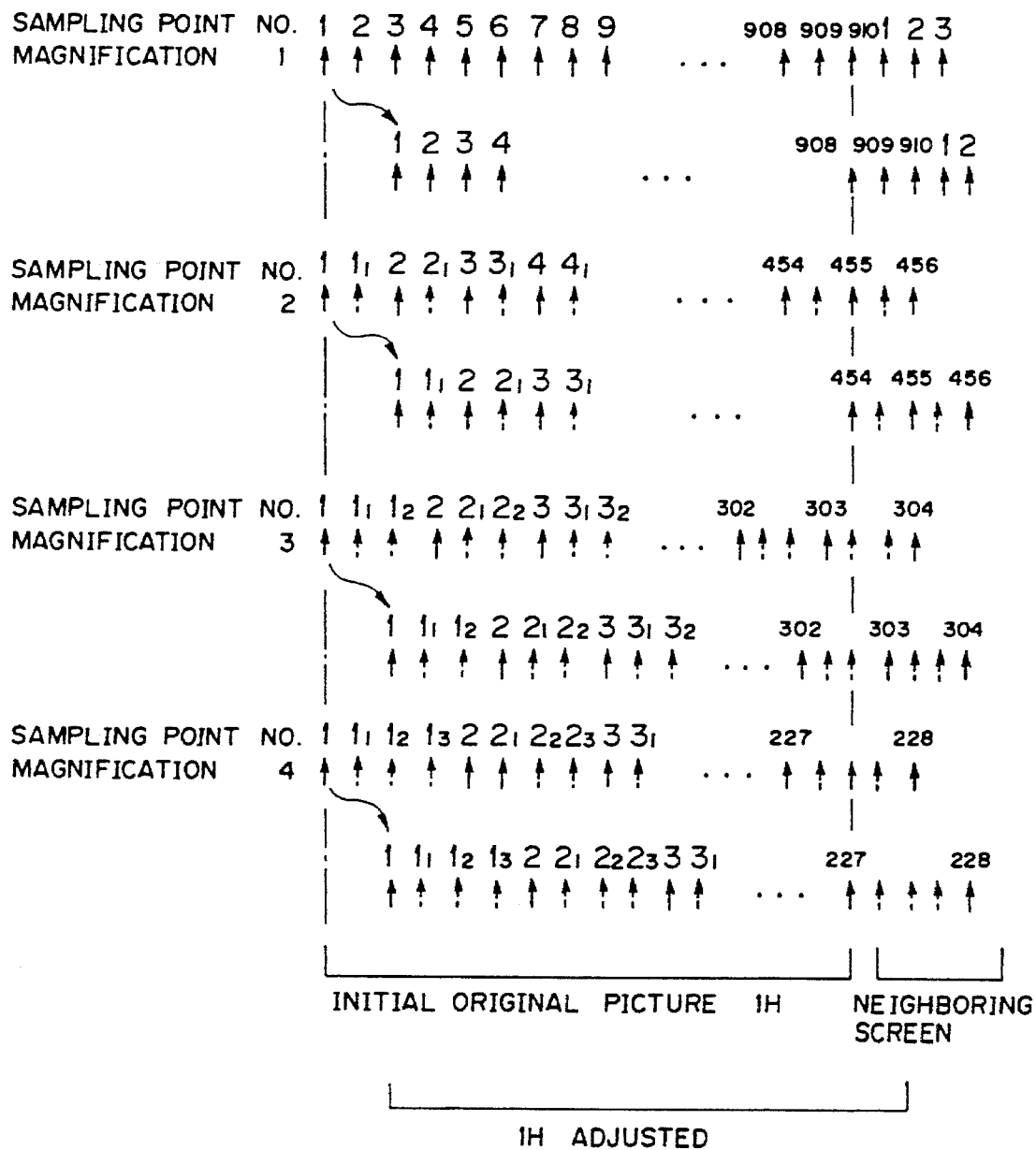
FIG. 12 is an illustration for fine adjustment of sampling points during one horizontal scanning period at multiple magnifications.
Figure 13A:
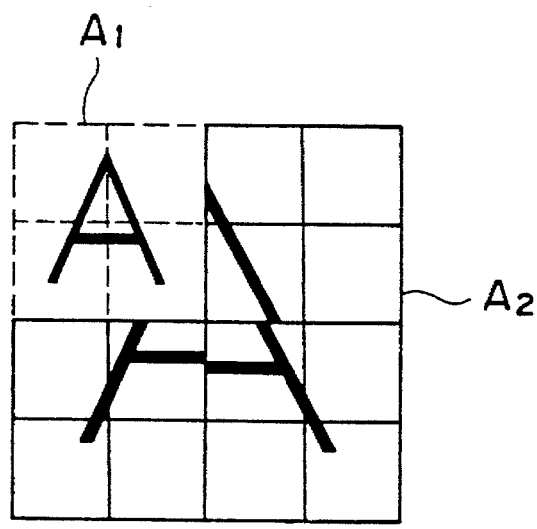
FIGS. 13(A) and 13(B) are display format views for display in a plurality of display units at multiple magnifications.
Figure 13B:
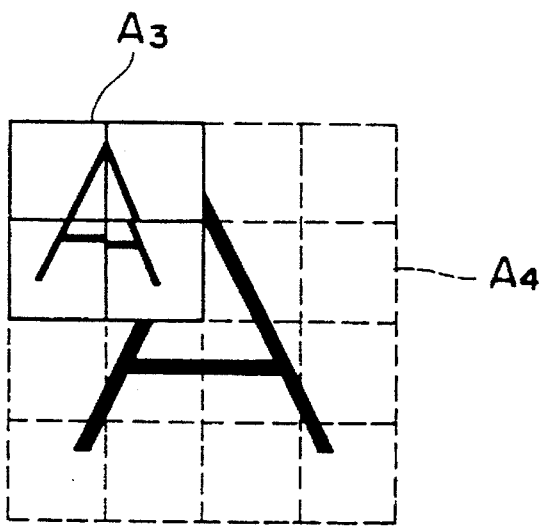

Then, description is made for operations of a conventional display control device with reference to FIG. 11 to FIG. 13.

At first, the input video signal $S_O$ for the original picture is divided into a luminance signal $Y_{RI}$ (including a luminance signal $Y_I$ and an interpolated signal $Y_R$) and input to an frame memory $3_Y$ and a color frame memory $3_C$ of the frame memory 3, respectively. In the operation for writing the signal $S_O$ in the frame memory 3, seprating positions for each magnification of 1 to 8 times (×1 to ×8) are adjusted in a separating position adjusting section 33 of the rough adjustment circuit 30. With this adjustment, a memory write signal WE to enable writing of a separating position is output from a screen separate signal generating section 32 according to the system clock $4f_{SC}$ and the frame pulse FP together with a reset write signal $RST_W$ as a start signal for writing. Writing operation into the frame memory 3 is performed by the memory write signal WE and the write reset signal $RST_W$. In the practical write operation, as shown in FIG. 11(A), the number of sampling points is 910 points for 1 horizontal scan period (H) under the sampling frequency of 14.3 $MH_z$ for a magnification of 1. Also, the number of sampling points for the magnification of 2 is 455 points that for the magnification of 3 is 303 points, that for the magnification of 4 is 227 points, . . . and that for the magnification of 8 is 113 points.

When reading a video signal written in the frame memory 3, the video image position adjusting section 34 adjusts a video image position of the display video signal $S_V$ in relation to horizontal direction (H) and vertical direction (V) at a common moving sampling interval corresponding to each magnification. With this adjustment, the video image position signal generating circuit 35 outputs a memory read signal RE to enable reading during a period corresponding to the separating position and a read reset signal $RST_R$ as a start point thereof. Reading the video signal is performed according to the memory read signal RE and the read reset signal $RST_R$. As shown in FIG. 11(A), video signals are output so as to sequentially read written video signals at each magnification at a sampling interval previously specified and common to each magnification.

The read video signals are interpolated by the interpolation circuit 4 every luminance signal and color signal, and as shown in FIG. 11(B), sampling points $1_1, 1_2, 1_3, \ldots 2_1, 2_2, 2_3 \ldots 3_1, 3_2, 3_3 \ldots$ indicated by chain lines with arrow heads are interpolated for each magnification (1 to 8). The interpolated video signals undergo D/A conversion in the interpolation circuit 4, and a luminance signal or a color signal or a video signal is output, as the display video signal $S_V$, to be displayed on the display section (not shown).

Thus, if a video image position is adjusted only at a certain magnification, continuity of an video image over a plurality of display units is lost at their borders because video image positions at magnifications not requiring adjustment are changed.

Further detailed description is made with reference to FIGS. 13(A) and (B). Now, let us assume that a video image is continuous over neighboring screens in the case of magnification of 2 as shown in an area A, but the continuity the video image is lost in the case of magnification of 4 as shown in an area $A_2$. In this case, if the video image positions in the case of the magnification of 4 are, as shown in an area $A_4$, adjusted by displacing them by 1 step to the right, continuity of the video image A can be obtained on borders between the screens for the magnification of 4 as shown in 13(B), but continuity of the video image A on borders between the screens for the magnification of 2 (or 3 etc.) is lost as shown in an area $A_3$ (see FIG. 12).

Note that, in the adjustment, 2 sample points as 1 step are moved because the luminance signal $Y_{RX}$ can be moved every 1 sampling point, and, however, the color of a color signal is inverted if the color signal is moved every 1 sampling point.

In a concrete example of the second embodiment, the problem that continuity of a video image is lost in the conventional display control device is solved as described below.

Figure 14:
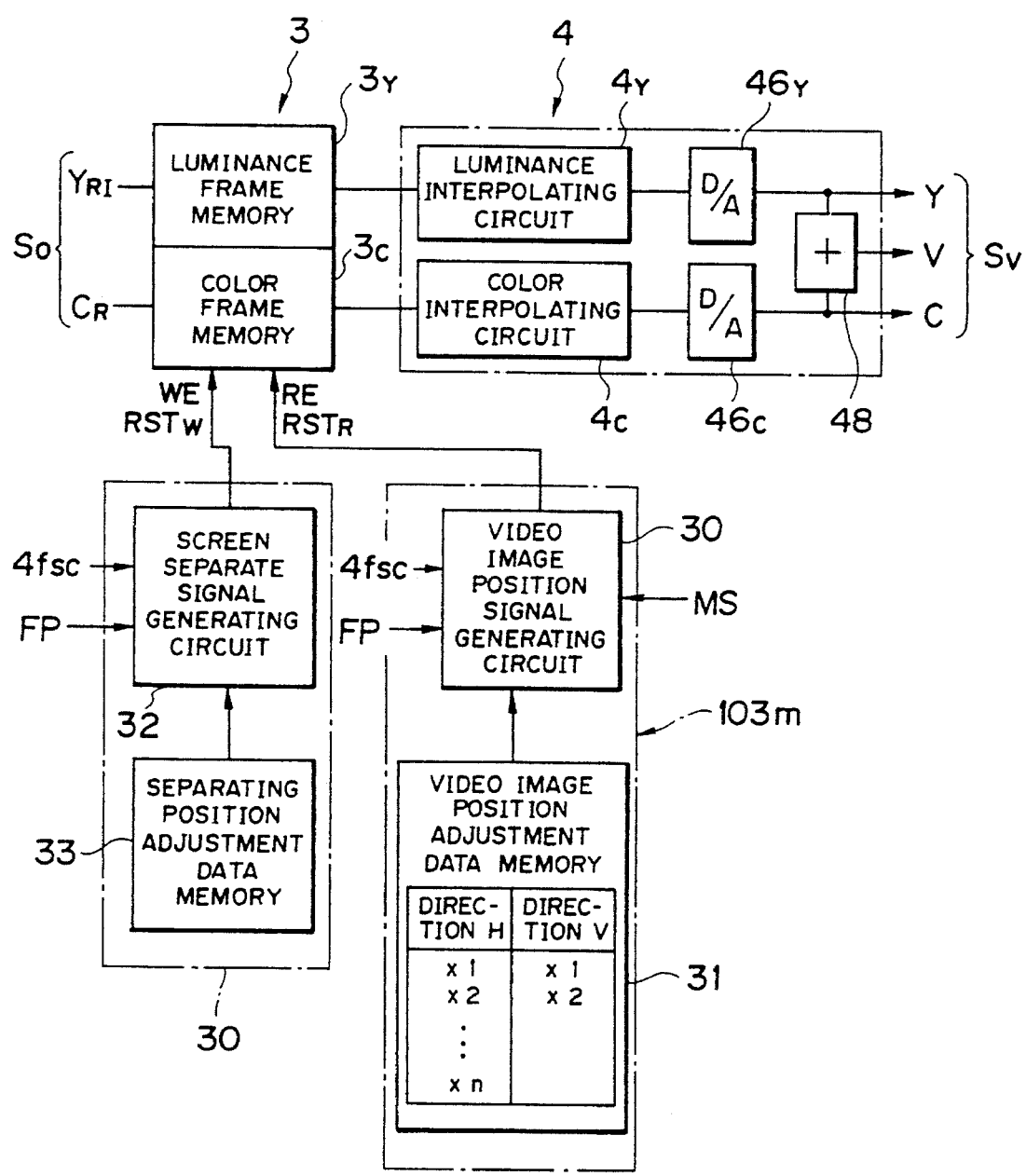
FIG. 14 is a concrete entire general view to illustrate the second embodiment of this invention.
Figure 15:
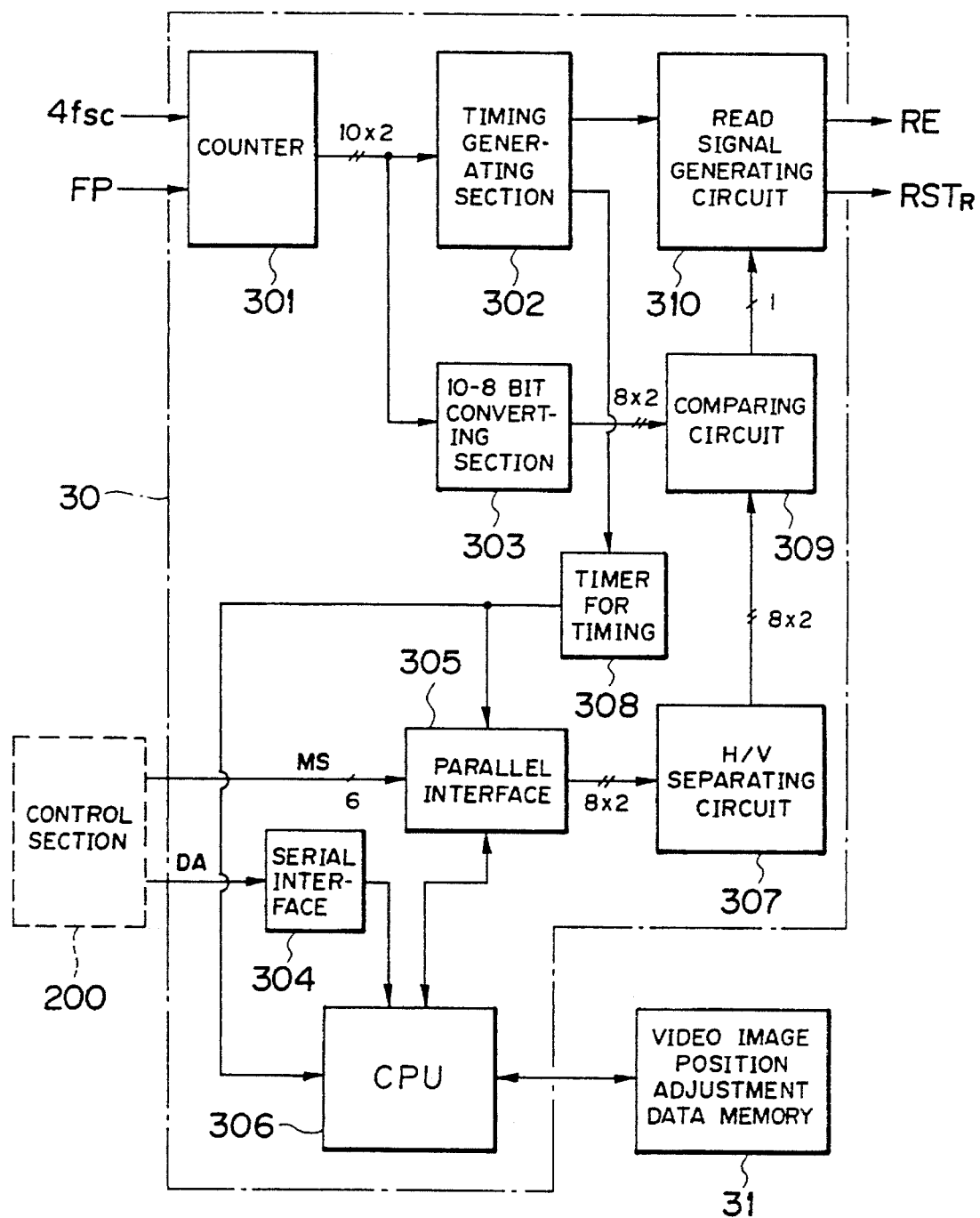
FIG. 15 is a detailed block diagram for an essential section of the second embodiment shown in FIG. 14.

Description is made for the concrete example of a display control device according to the second embodiment with reference to FIG. 14 and FIG. 15.

In each of the figures, a video image position adjustment circuit according to this embodiment has a frame memory 3, a rough adjustment circuit 30, a fine adjustment circuit 103m, and an interpolation circuit 4, but a configuration of the fine adjustment circuit 103m is different from the conventional one. The fine adjustment circuit 103m has a video image position adjustment data memory 31 to store each video image position adjustment data (x1, x2 . . . xn) corresponding to a plurality of magnifications for each screen comprising a plurality of display units (not shown), and a video image position signal generating circuit 30 to read video image position adjustment data, corresponding to a magnification select signal MS input from an external control section 200, from the frame adjustment data memory 31, to generate a memory read signal RE and a read reset signal $RST_R$ and to output the memory read signal RE and the read reset signal $RST_R$ as a read signal to the frame memory 3.

Then, description is made below for operations of the circuit in this embodiment having the configuration, especially in a case where an video image is enlarged in the horizontal direction by a specified magnification, with reference to FIGS. 14 and 15.

An input video signal $S_O$ for the original picture is input, and the input video signal $S_O$ is divided into an luminance signal $Y_{RI}$ and a color signal CR according to a memory write signal WE and a write reset signal $RST_W$ output from a rough adjustment circuit 30 like in the device based on the conventional technology shown in FIG. 10, and these signals are stored in the luminance frame memory $3_Y$ and the color frame memory $3c$ of each frame memory 3 after rough adjustment according to the magnification.

An operation to read when displaying the input video signal $S_O$ stored in the frame memory 3 at a specified magnification is described below. At first, adjustment data DA corresponding to a plurality Of magnifications are input into a CPU 306 as a control means via a serial interface 304 from a control section 200, and according to control by the CPU 306, video image position adjustment data x1, x2, xn corresponding to a plurality of magnifications for each screen in each display section are stored in the video image position adjustment data memory 31. The video image position data memory 31 comprises such devices as an EEPROM or an NVRAM (non-voltatile RAM) accessible for the CPU 306, stores each video image position adjustment data from a specified address as 8-bit data in a map format. Data write can be performed when this device is installed, and data rewrite may be made after installation thereof.

Furthermore, when a magnification select signal MS (3 bits of magnification in the horizontal direction, and 3 bits of magnification in the vertical direction) is output from the control section 200, this magnification select signal MS is input via a parallel interface 305 to the CPU 306, and the CPU 306 reads out a video image position adjustment data with a magnification specified by the magnification select signal MS. The video image position adjustment data thus read out is input via the parallel interface 305 to a horizontal/vertical (H/V) separation circuit 307, and according to a time dividing function of this H/V separation circuit 307, the data is divided into horizontal (H) direction video image position adjustment data and vertical (V) direction video image position adjustment frame adjustment data.

On the other hand, the system clock $4f_{SC}$, which is a sampling frequency signal common to all of the display units U1 to Un, and the frame pulse FP are input to a counter 301, and the counter 301 counts 910 points for $4 F_{SC}$ during 1 horizontal scan period (H) and counts 525 points for an edge of the frame pulse FP during 1 vertical scan period (V). The values counted by this counter 301 are output to a timing generator 302, and at the same time compressed to an 8-bit signal via a 10–8 bit convertor 303 and output to a comparator (comparing circuit) 309.

The comparator 309 compares each of the counted value in the horizontal and vertical directions with each of the video image position adjustment data in the horizontal and vertical directions output from the H/V separation circuit 307. When a result of comparison in relation to the horizontal and vertical directions is acceptable, each pulse is output, and logical product conditions for each of the outputs in the horizontal and vertical directions are calculated. The logical result is output as a 1-bit read reset signal $RST_R$ to a read signal generating circuit 310. Also the timing generating section 302 outputs an original signal for each timing in the horizontal and vertical directions to the read signal generating circuit 310 depending on each of the values in the horizontal and vertical directions counted by the counter 301. The read signal generating circuit 310 has the same number of memories (16 pieces) as that of screens (16 screens) in the display section, to which an original signal for timing signals output from the timing generating section 302 is commonly supplied. The memory read signal RE to specify a display start point for each screen and a read reset signal $RST_R$ are output with the timing delayed by reading from the time point of the 1-bit read reset signal $RST_R$ for each screen. The timing generating circuit 302 outputs a timing signal to the CPU 306 via a timer 308.

In this embodiment, the interpolation circuit 4 is arranged after the frame memory 3, but the interpolation circuit 4 may be arranged before the frame memory 3.

As described above, in the second embodiment, the display control device stores a plurality of video image position adjustment data in the video image position adjustment data storage means 31 in correspondence to each display format, reads out a corresponding video image position adjustment data from the plurality of video image position adjustment data according to a display format select signal such as a magnification select signal MS, generates a read signal to read input video signals according to the video image position adjustment data thus read out in a video image position signal generating means, and reads and displays input video signals stored in an video signal storage means specified by this read signal in the video image display means. As the read signal is generated according to video image adjustment data corresponding to each display format, the video image can be displayed without losing its continuity over borders between neighboring display units in any display format.

OUTLINE OF A THIRD EMBODIMENT OF THIS INVENTION

Figure 16:
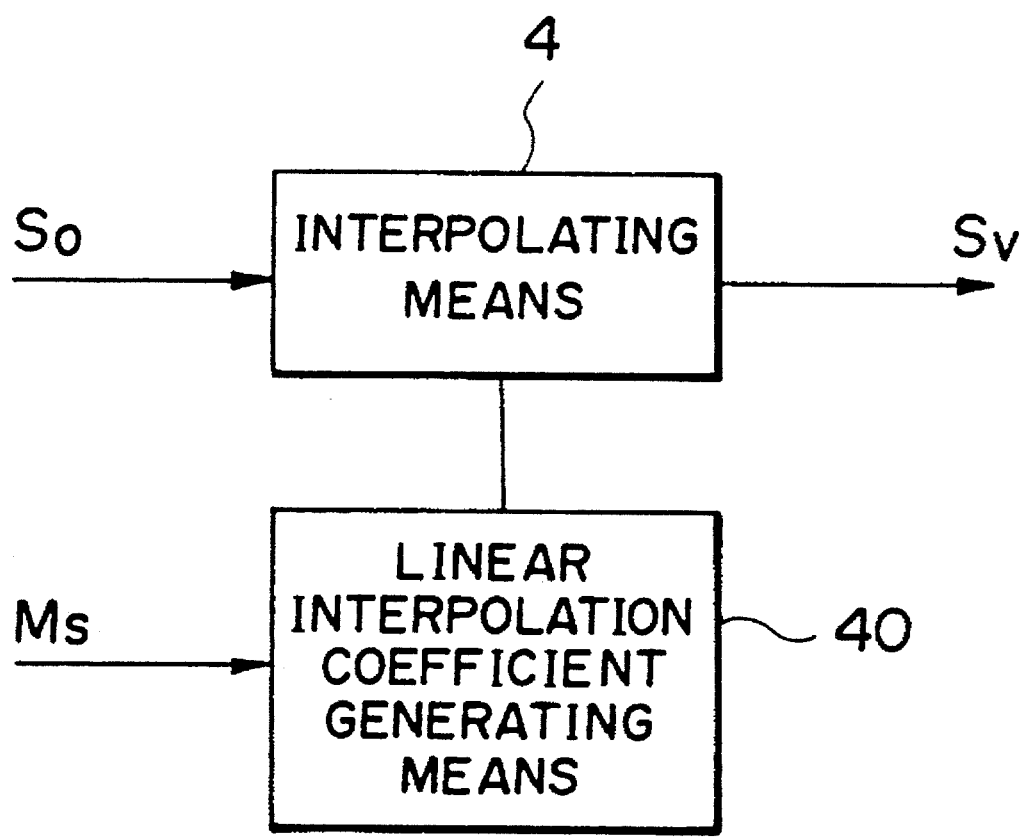
FIG. 16 is an illustration of a principle of a third embodiment of this invention.

FIG. 16 shows a principle of a third embodiment of this invention. In this figure, a display control device according to a principle of the third embodiment has a linear interpolation generating means 40 to generate linear interpolation (coefficients), in correspondence with each magnification of a magnification signal MS, which specify weights for each of neighboring picture elements in an input video signal $S_O$ adjacent to a picture element to be interpolated in accordance with the magnification signal MS, and an interpolating means 4 to linearly interpolate input video signals $S_O$ according to the linear interpolation coefficients and output interpolated output video signals $S_V$, and outputs this interpolated video signals as output signals by interpolating neighboring picture elements in input video signals for enlarged display.

According to the third embodiment, linear interpolation coefficient corresponding to a magnification signal specifying enlarged display of input video signals $S_O$ optionally magnified in at least one of the horizontal and vertical directions is generated, linear interpolation is performed by weighing neighboring picture elements of each picture element to be displayed in an enlarged form according to a linear interpolation coefficient to obtain densities of picture elements suited to each magnification by interpolating each picture element required for intervals between neighboring picture elements each different from each other depending on each magnification. When linear interpolation is performed by computing linear interpolation coefficients for each zone obtained by dividing the ordinary interval by the magnification, the density of picture elements is increased in proportion to the magnification.

A CONCRETE EXAMPLE OF THE THIRD EMBODIMENT OF THIS INVENTION

Figure 17:
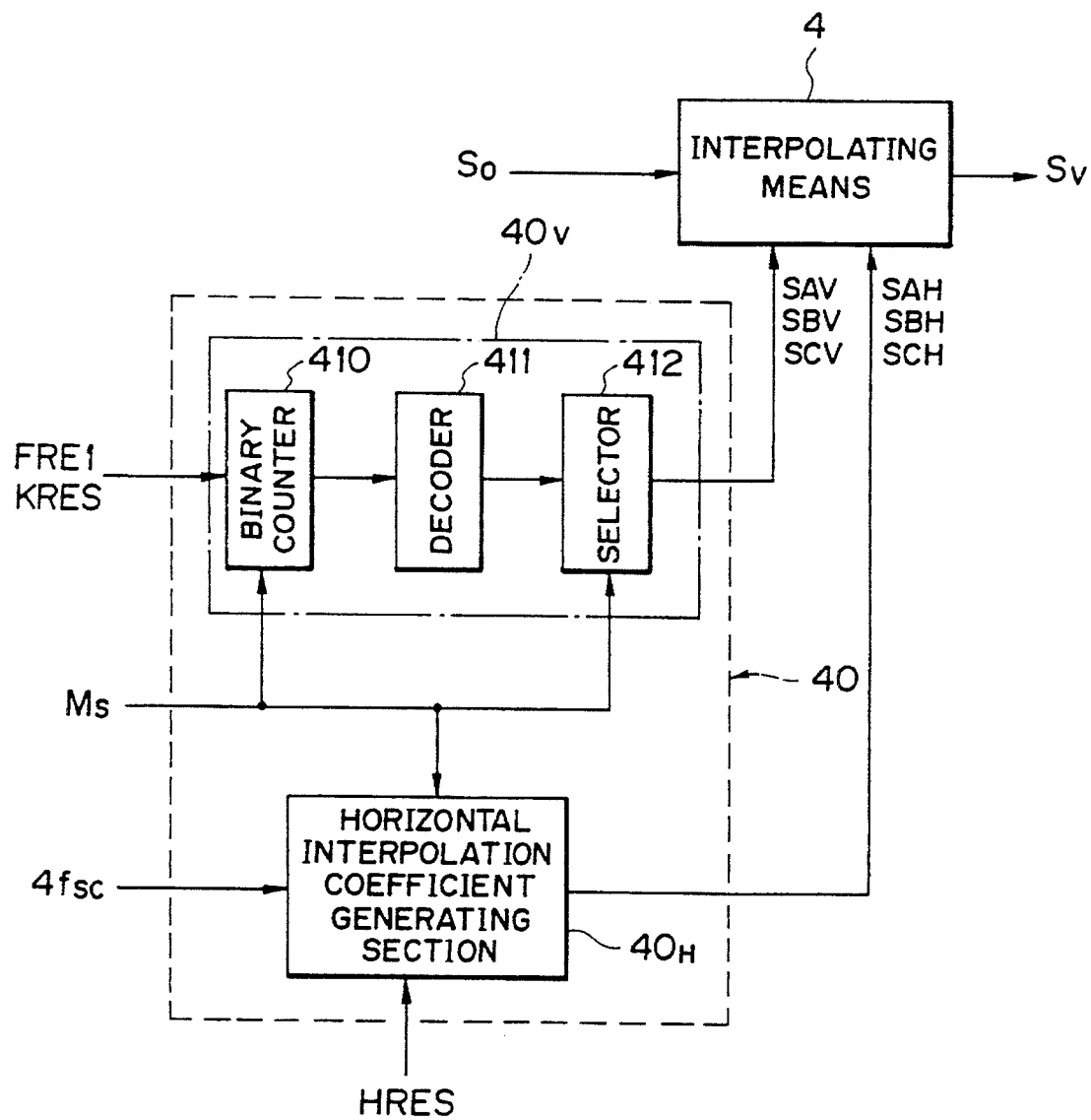
FIG. 17 is an entire block diagram to illustrate a third embodiment of this invention.

Description is made below for a preferred example of a display control device according to the third embodiment with reference to FIGS. 17 to 25. In FIG. 17, the display control device in the third embodiment has a vertical interpolation coefficient generating section $40_V$ to generate vertical interpolation coefficients SAV, SBV, and SCV corresponding to the magnification signal MS under control by a frame edge signal FRE1 indicating a reference point for each frame and a clock signal KRES indicating a reference point for each scanning line, a horizontal interpolation coefficient generating section $40_H$ to generate horizontal interpolation coefficients SAH, SBH, and SCH corresponding to the magnification signal MS under control by a horizontal sync. signal HRES, a sampling frequency, and a system clock $4f_{SC}$ which is 4 times higher than a frequency of the same color sub-carrier wave, and an interpolating means 4 to which the vertical linear interpolation coefficients SAV, SBV, and SCV as well as the horizontal linear interpolation coefficients SAH, SBH, and SCH, and which interpolates input video signals So according to each of these coefficients and output the interpolated signals as output video signals $S_V$.

Figure 18:
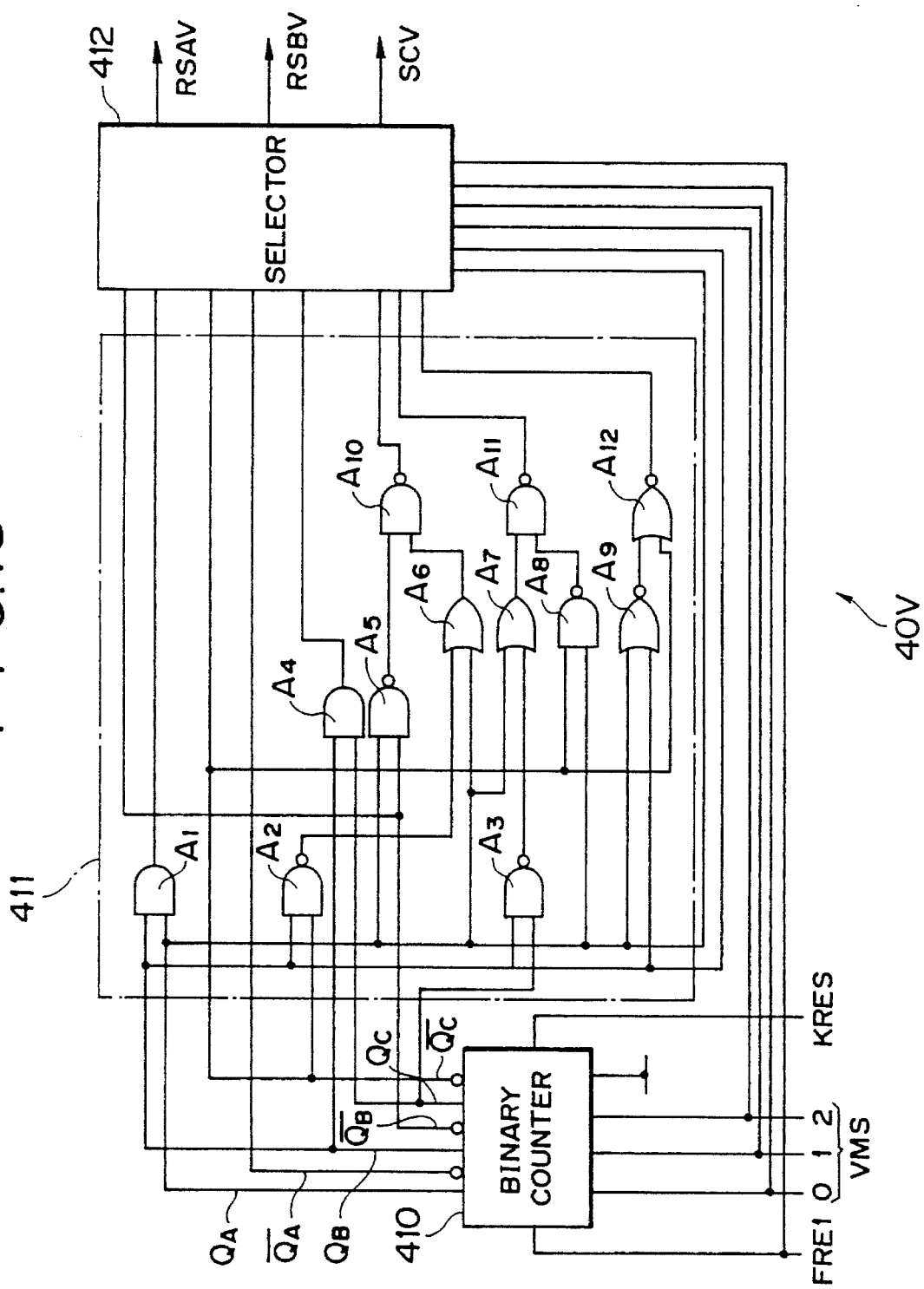
FIG. 18 is a detailed circuit view for a vertical interpolation coefficient generating section in the embodiment shown in FIG. 17.
Figure 19:
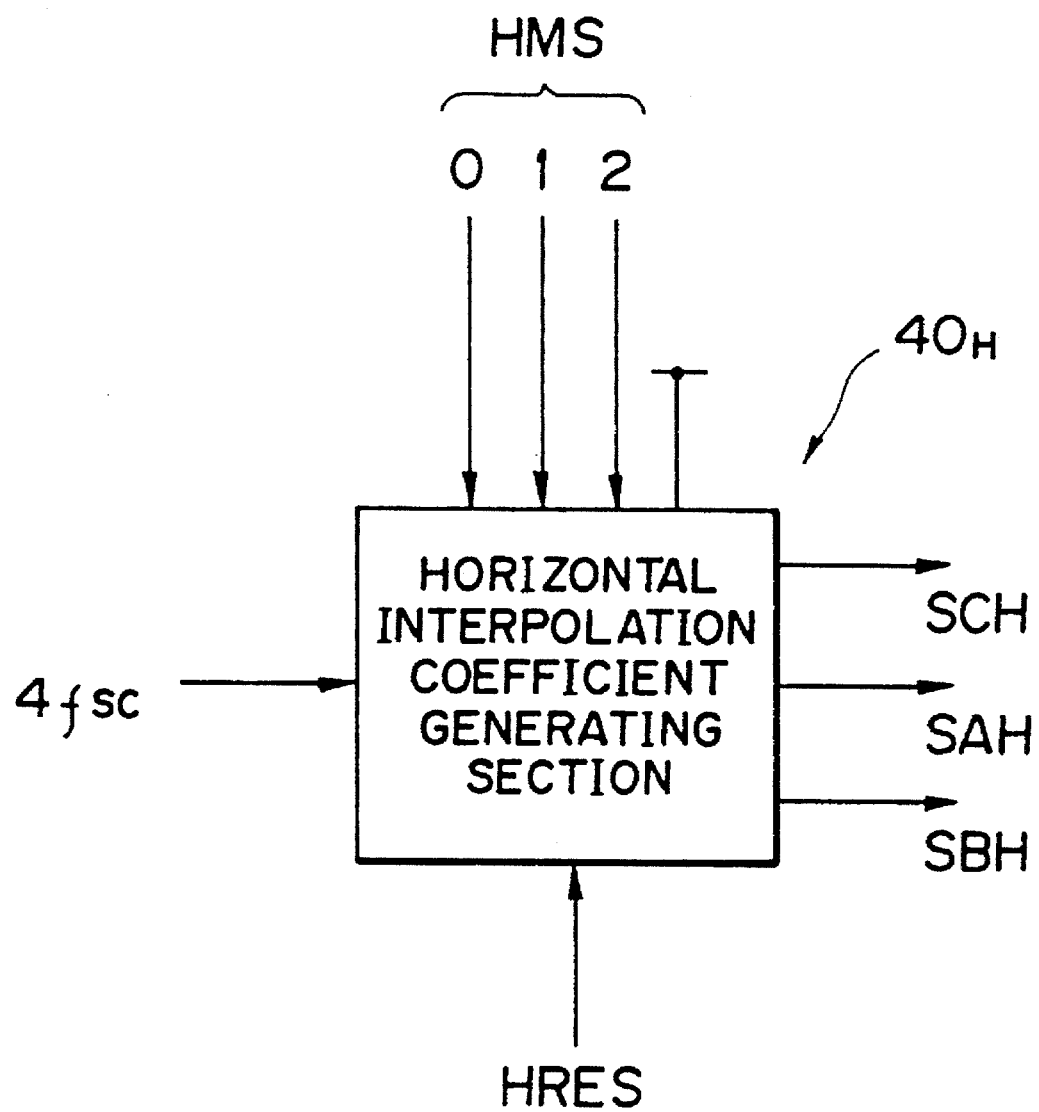
FIG. 19 is a detailed connection view for a horizontal interpolation coefficient generating section in the embodiment shown in FIG. 17.

As shown in FIG. 18, the vertical interpolation coefficient generating section $40_V$ has a binary counter 410 into which a vertical magnification signal VMS in a magnification signal MS is input and which converts the signal to a progressive number in correspondence with the magnification of the signal MS, computes a clock signal KRES according to the converted progressive number, resets this computed value according to a frame edge signal FRE1, and outputs a binary value $Q_A$, air inverted $Q_A$, a value binary $Q_B$, an inverted $Q_B$, a binary value $Q_C$, and an inverted $Q_C$, a decoder 411 having various circuits $A_1$ to $A_{12}$ to generate each of interpolation coefficient data available for all magnifications according to the binary value $Q_A$ to the inverted $Q_C$, and a selector 412 to select vertical interpolation coefficient data corresponding to a magnification of the vertical magnification signal $VMS_V$ from the generated vertical interpolation coefficient data and to output linear interpolation coefficients SAV, SBV, and SCV.

Although not shown in the figure, in addition to the circuit shown as the decoder 411, a decoding function is also included in the binary counter 410 and the selector 412 so that FIG. 18 shows a complete function to generate each interpolation coefficient data as a whole.

OPERATIONS OF THE CONCRETE EXAMPLE OF THE THIRD EMBODIMENT

Then, description is made for operations of the third embodiment based on the configuration with reference to FIG. 18 to FIG. 25.

Figure 21:
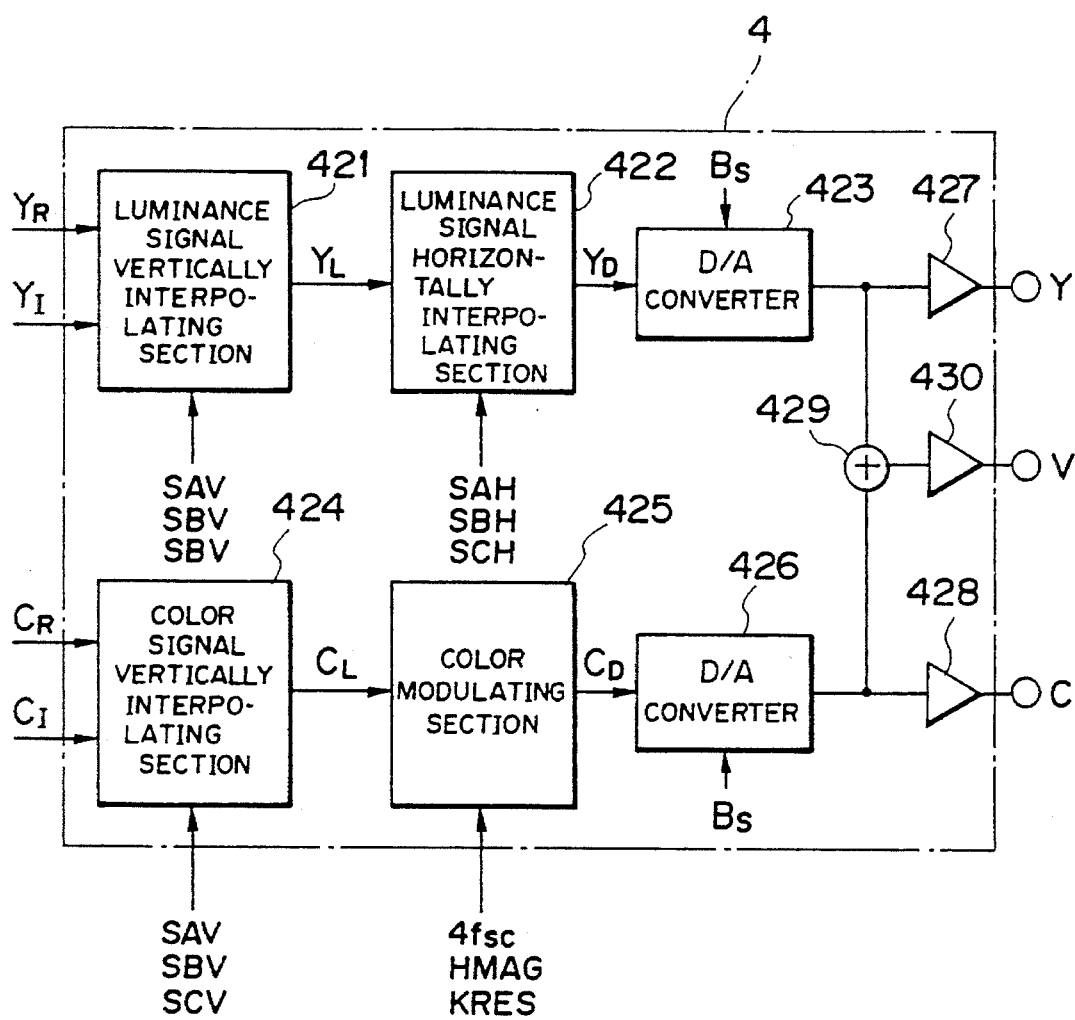
FIG. 21 is a detailed circuit view for an video signal processing section in the embodiment shown in FIG. 17.

At first, in FIG. 21 let us assume that a real luminance signal $Y_R$ (equivalent to $Y_{RS}$ in the first embodiment shown in FIG. 5) for an input video signal to be input, and a primarily interpolated luminance signal $Y_I$ (equivalent to $Y_{IS}$ in FIG. 5) to be input between scanning lines in each field to increase the number of scanning lines two times thereby to improve the picture quality are input into a luminance signal vertically interpolating section 421, and a color signal $C_R$ synthesized from color difference signals R-Y and B-Y (equivalent to $C_{RS}$ in FIG. 5), and primarily interpolated color signals $C_1$ (equivalent to $C_{IS}$ in FIG. 5) synthesized by primarily interpolating the color signal $C_R$ are input into a color signal interpolating section 424. Also it is assumed that, in this state, the vertical magnification signal VMS and the horizontal magnification signal HMS of the magnification signal MS for a specified magnification are input. When the vertical magnification signal VMS is input into the binary counter 410 and the selector 412 in the vertical interpolating coefficient generating section $40_V$, respectively, the binary counter 410 outputs the binary value $Q_A$, the inverted $Q_A$, the binary value $Q_B$, the inverted $Q_B$, the binary value $Q_C$, and the inverted $Q_C$ to the decoder 411. This decoder 411 generates vertical interpolation coefficients for all magnifications by computing the logical conditions from the binary values $Q_A$ to the inverted $Q_C$ and output the data to the selector 412. FIG. 20 shows the vertical and horizontal interpolation coefficient data for magnification from x1 to x8, dividing them into odd number (first) fields and even number (second) fields. The selector 412 selects the vertical interpolation coefficient data corresponding to the magnifications of "x3" or others in the vertical magnification signal VMS and outputs the data as SAV and SBV which become numerators for linear interpolation coefficients and as SCV which becomes a denominator for linear interpolation coefficients to the interpolating means 4. Note that the coefficients shown in FIG. 20 are required because the coefficients are based on a frequency interleaving system of NTSC system and there are odd number and even number fields.

Also, the horizontal interpolation coefficient generating section $40_H$ outputs to the intepolating means 4 horizontal interpolation coefficient data corresponding to magnification such as "x3" in FIG. 20 according to the horizontal magnification signal HMS, the system clock $4f_{SC}$ and the horizontal sync. signal KRES as SAH and SBH which become numerators for linear interpolation coefficients and as SCH which becomes a denominator for linear interpolation coefficients.

As shown in FIG. 21, the real luminance signal $Y_R$, primarily interpolated luminance signal $Y_I$, a real color signal $C_R$, and a primarily interpolated color signal $C_I$ are input into the interpolating means 4 as input video signals $S_O$, respectively, which divides the signals $S_O$ into luminance signals and color signals to interpolate the signals $S_O$. Herein, the real luminance signal $Y_R$ and the real color signal $C_R$ are signal elements originally contained in the input video signals $S_O$, while the primarily interpolated luminance signal $C_R$ and the primarily interpolated color signal $C_I$ are signal elements interpolation system, interpolated and added in the previous stage (equivalent to the input means in FIG. 1) of the circuits in this embodiment. The primarily interpolated luminance signal $Y_I$ is interpolated by a movement-adaptive scanning line while the interpolated color signal $C_I$ is interpolated by a linear interpolation system.

As for interpolation of the luminance signal $Y_R$ and $Y_I$, a luminance signal vertically interpolating section 421 interpolates the luminance signals $Y_R$ and $Y_I$ according to the vertical interpolation coefficients SAV, SBV, and SCV to output a luminance signal $Y_L$ as a result of interpolation referring to the real luminance signal $Y_R$ and the primarily interpolated luminance signal $Y_I$. A luminance signal horizontally interpolating section 422 connected to the latter stage of the luminance signal vertically interpolating section 421 horizontally interpolates the vertically interpolated luminance signal $Y_L$ according to the horizontal interpolation coefficients SAH, SBH and SCH to output a horizontally interpolated luminance signal $Y_D$. The horizontally interpolated luminance system $Y_D$ is input into a D/A converter 423, and the D/A convertor 423 adds a blanking signal $B_S$ thereto, then performs D/A conversion, adds a sync. signal SYNC, and then outputs it as a luminance signal Y via an amplifier 427.

Also, as for interpolation of the color signal, a horizontally interpolated color signal C is output via a color signal vertically interpolating section 424, a color modulating section 425, a D/A convertor 426, and an amplifier 428. Note that, in the color modulating section 425, horizontal interpolation is made according to the system clock $4f_{SC}$, the horizontal magnification signal HMS, and the clock signal KRES to obtain a frequency and a format of the color sub-carrier. In the D/A convertor, D/A conversion is made after a burst signal BS is added.

The interpolated luminance signal Y and the interpolated color signal C are added to each other by the adder 429, then amplified by the amplifier 430 and output as a video signal V.

Figure 22:
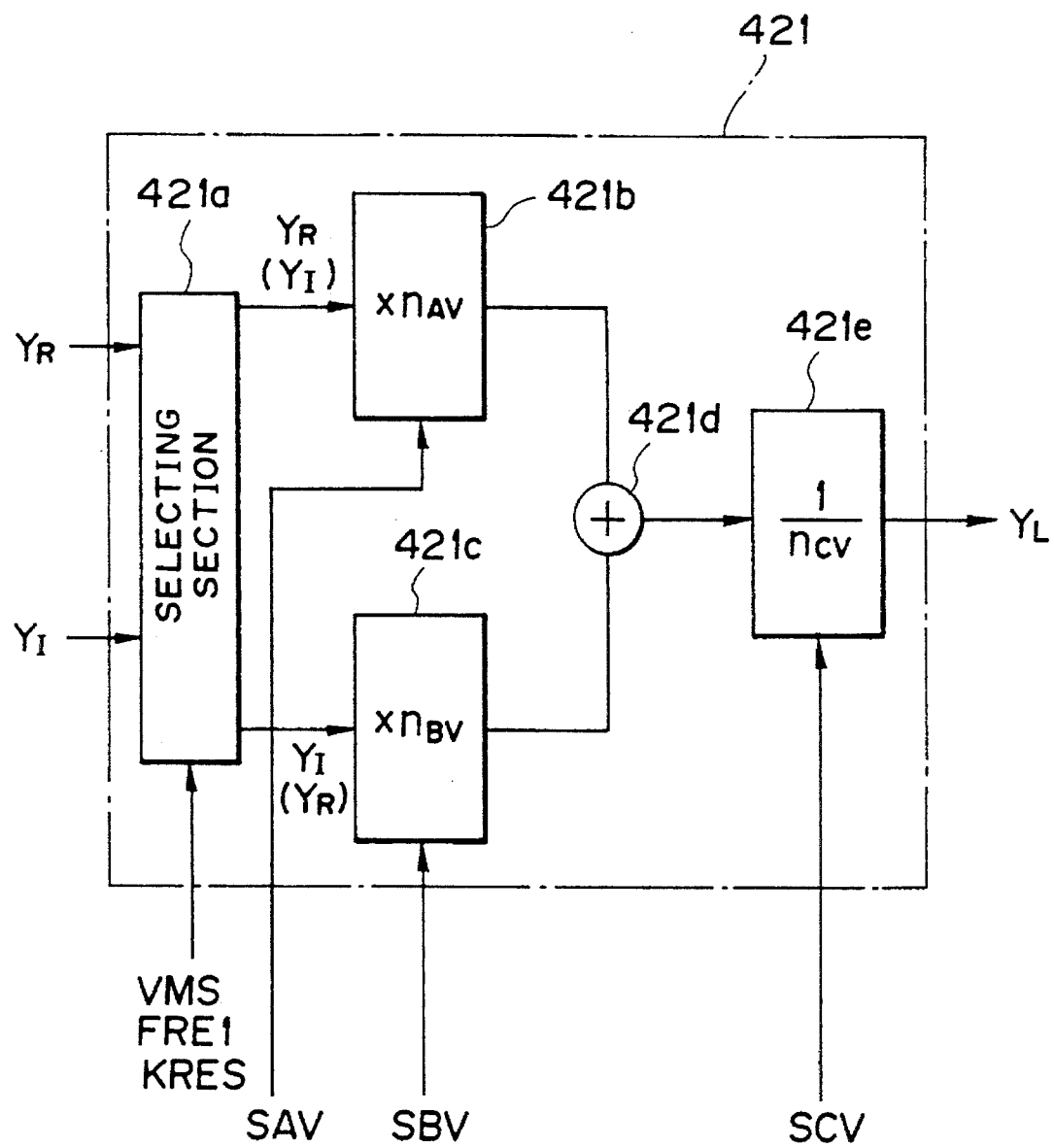
FIG. 22 is a detailed circuit view for an illustration signal vertical interpolation section in the video signal processing section shown in FIG. 21.
Figure 23:
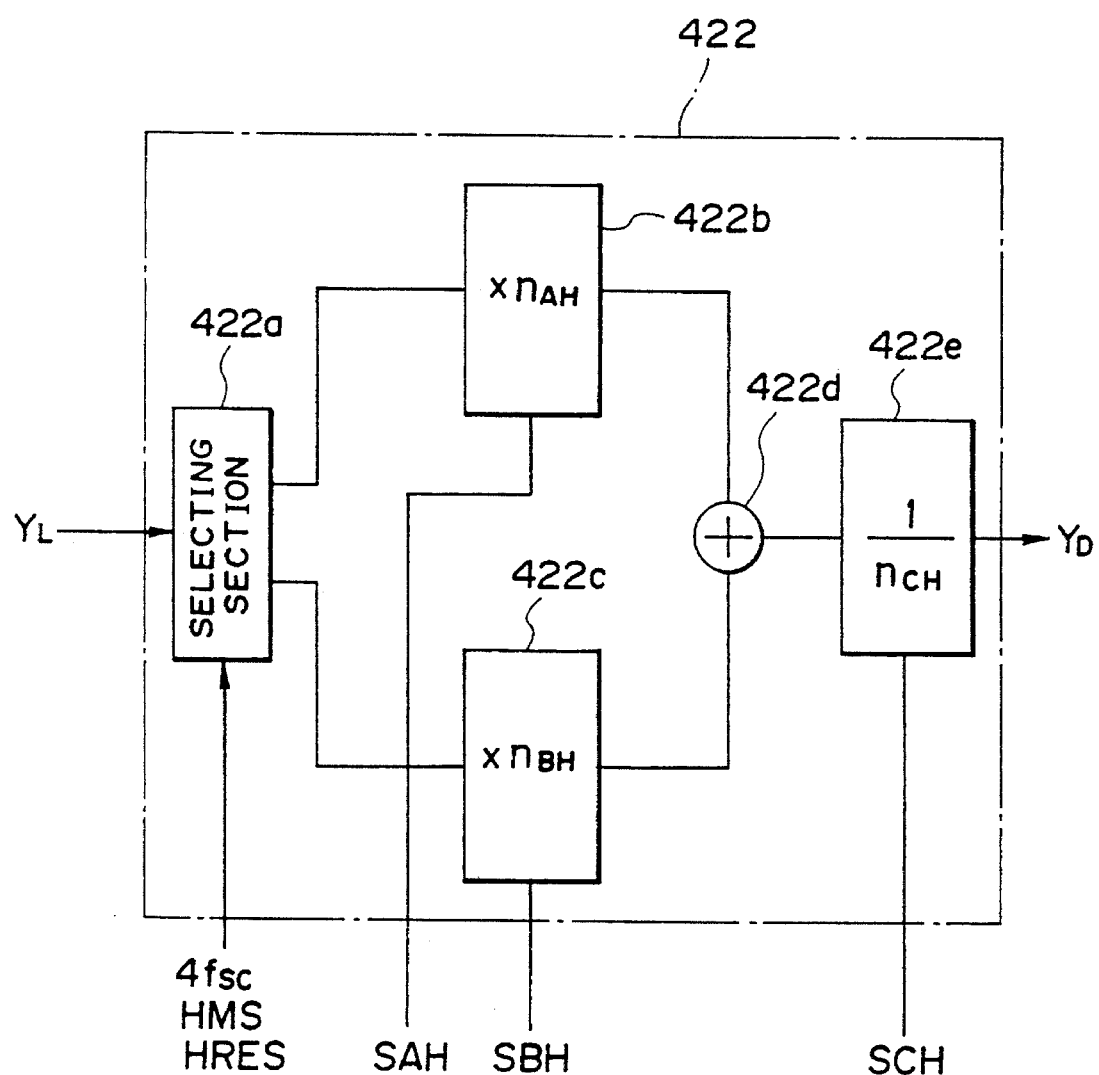
FIG. 23 is a detailed circuit view for a luminance signal horizontal interpolation section in the video signal processing section shown in FIG. 22.

Detailed description is made below for interpolation of the luminance signal with reference to FIG. 22 and FIG. 23. At first, the real luminance signal $Y_R$ is input into the multiplier 421a of the luminance signal vertically interpolating section 421, and the real luminance signal $Y_R$ is multiplied by the vertical interpolation coefficient SAV as $Xn_{AV}$. The primarily interpolated luminance signal $Y_I$ is input into the multiplier 421c via the selecting section 421a, and the primarily interpolated luminance signal $Y_I$ is multiplied by the vertical interpolation coefficient SBV as $xn_{BV}$. After these products of multiplication are added by an adder 421d, the sum is multiplied by a vertical interpolation coefficient SCV by the multiplier 421e as $1/n_{CV}$ to output the vertically interpolated luminance signal $Y_L$. As a result, the luminance signal $Y_L$ is $(Y_R \times n_{AV} + Y_I \times n_{BV})/n_{CV}$.

Furthermore, the vertically interpolated luminance signal $Y_L$ are input to the luminance signal horizontally interpolating section 422, and the luminance signal $Y_L$ corresponding to each picture element to be multiplied by an interpolation coefficient, is distributed, for each picture element, to the multipliers 422b and 422c by the selecting section 422a switched according to the system clock $4f_{CS}$, the horizontal magnification signal HMS and the horizontal sync. signal KRES. The luminance signals $Y_L$ are multiplied by horizontal interpolation coefficients SAH and SBH in the multipliers 422b and 422c, respectively, as $xn_{AH}$ and $xn_{BH}$. The products are added by the adder 422d, and the sum is multiplied by the horizontal interpolation coefficient SCH as $1/n_{CH}$ in the multiplier 422e. The products are output as horizontally interpolated luminance signals $Y_D$.

DETAILED OPERATIONS OF THE CONCRETE EXAMPLE OF THE THIRD EMBODIMENT

Figure 24:
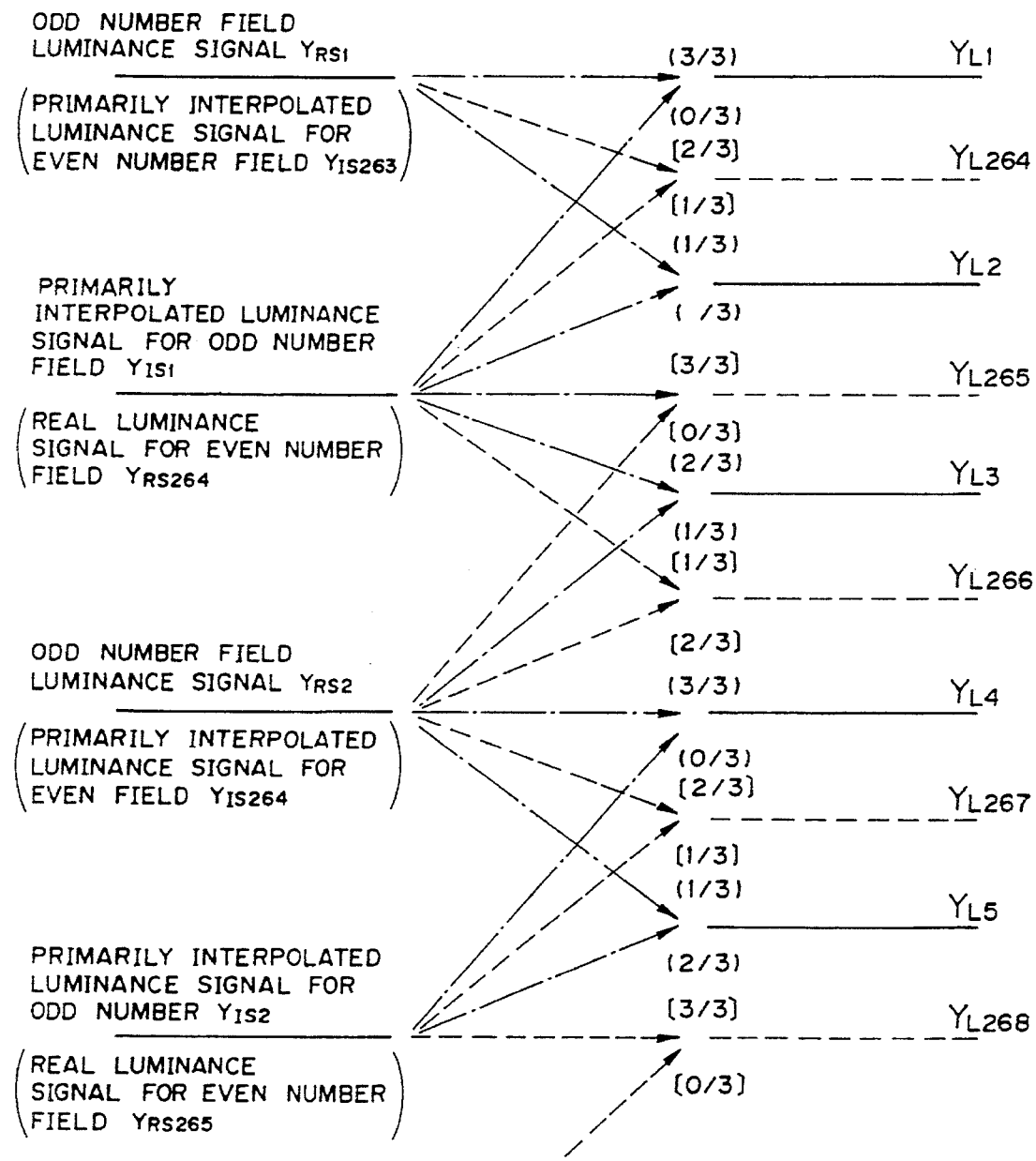
FIG. 24 is an illustration for linear interpolation in vertical direction in the embodiment shown in FIG. 17.

Description is made below for detailed operations of the third embodiment with reference to FIG. 24 and FIG. 25. FIG. 24 is an illustration of linear interpolation in the vertical direction. When enlarging the odd number real luminance signals $Y_{RS1}$, $Y_{RS2}$, ... and odd number primarily interpolated luminance signals $Y_{IS1}$, $Y_{IS2}$, ... in odd number fields in this figure at the magnification of 3, $K_{a3}=\frac{3}{3}$, $\frac{1}{3}$, and $\frac{2}{3}$, $K_{b3}=\frac{0}{3}$, $\frac{2}{3}$, and $\frac{1}{3}$ in the column of vertical interpolation coefficients for the odd fields to be enlarged at the magnification of 3 in FIG. 20 are sequentially output from the vertical interpolation generating section $40_V$ for each timing of scanning lines to be displayed. The vertically interpolated luminance signals $Y_L$ ($Y_{L1}$, $Y_{L2}$ ...) are obtained from the vertical interpolation coefficients. The luminance signal $Y_{L1}$ is vertically interpolated in accordance with a weighing $\{Y_{RS1}(\frac{3}{3})+Y_{IS1}\times(\frac{0}{3})\}$, $Y_{L2}$ in accordance with a weighing $\{Y_{RS1}(\frac{1}{3})+Y_{IS1}\times(\frac{2}{3})\}$, $Y_{L3}$ in accordance with a weighing $\{Y_{RS1}(\frac{2}{3})+Y_{RS2}\times(\frac{1}{3})\}$, $Y_{L4}$ in accordance with a weighing $\{Y_{RS2}(\frac{3}{3})+Y_{IS2}\times(\frac{0}{3})\}$ ... serially. Also in even number fields, vertical interpolation is performed like the odd number fields.

Note that selection of neighboring luminance signals to be used for interpolation is made by the selecting sections 421a according to the vertical magnification signal VMAC, the frame edge signal FRE1, and the clock signal KRES.

Figure 25:
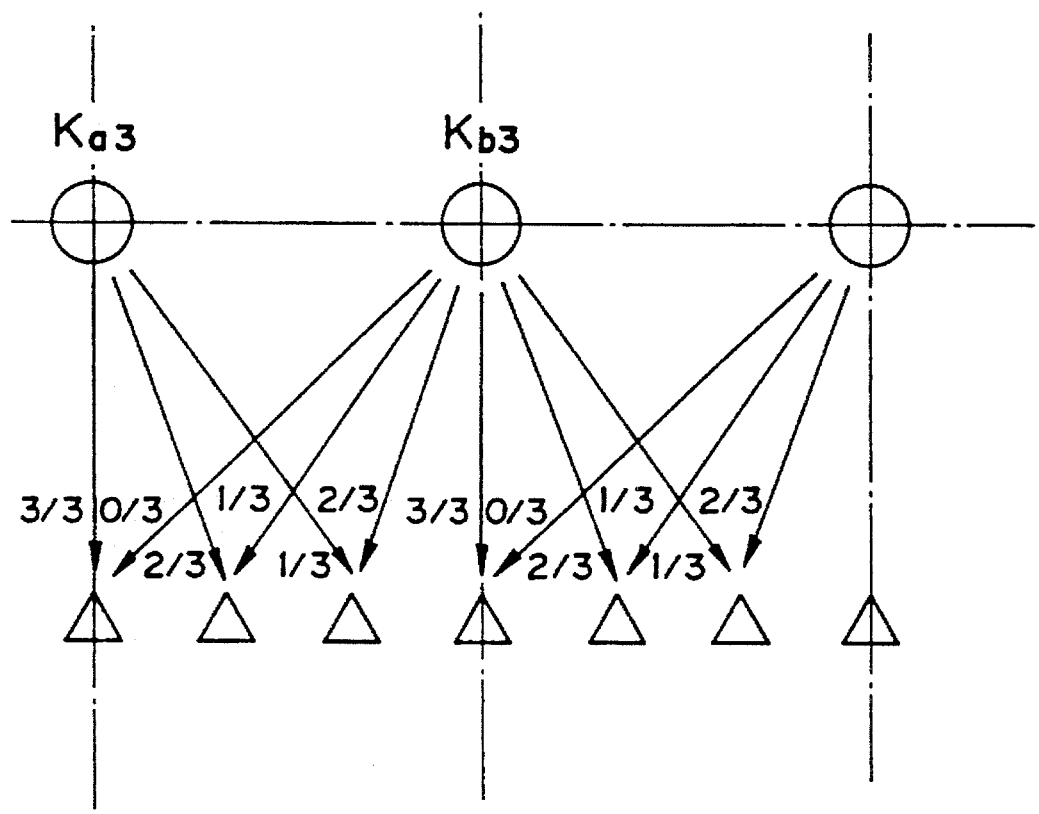
FIG. 25 is an illustration for linear interpolation in horizontal direction in the embodiment shown in FIG. 17.

FIG. 25 is an illustration of horizontal interpolation. When enlarging the interpolated luminance signals $Y_{L1}$, $Y_{L2}$, $Y_{L3}$ ... at a magnification of 3 in this figure, horizontal interpolation coefficients $K_{a3}=\frac{3}{3}$, $\frac{2}{3}$ and $\frac{1}{3}$ and $K_{b3}=\frac{0}{3}$, $\frac{1}{3}$ and $\frac{2}{3}$ for the magnification of 3 in FIG. 20 are output from the horizontal interpolation coefficient generating sections $40_H$. Horizontally interpolated luminance signals $Y_{D1}$, $Y_{D2}$, $Y_{D3}$ ... are calculated from the horizontal interpolation coefficients. The luminance signal $Y_{D1}$ is horizontally interpolated in accordance with a weighing $\{Y_{L1} (\frac{3}{3})+Y_{L2}\times(\frac{0}{3})\}$, the luminance signal $Y_{D2}$ in accordance with a weighing $\{Y_{L1} (\frac{2}{3})+Y_{L2}\times(\frac{1}{3})\}$, the luminance signal $Y_{D3}$ in accordance with a weighing $\{Y_{L1}\times (\frac{1}{3})+Y_{L2}\times(\frac{2}{3})\}$, and the luminance signal $Y_{D4}$ in accordance with a weighing $\{Y_{L2} (\frac{3}{3})+Y_{L3}\times(\frac{0}{3})\}$.

OTHER CONCRETE EXAMPLE OF THE THIRD EMBODIMENT

Figure 26A:
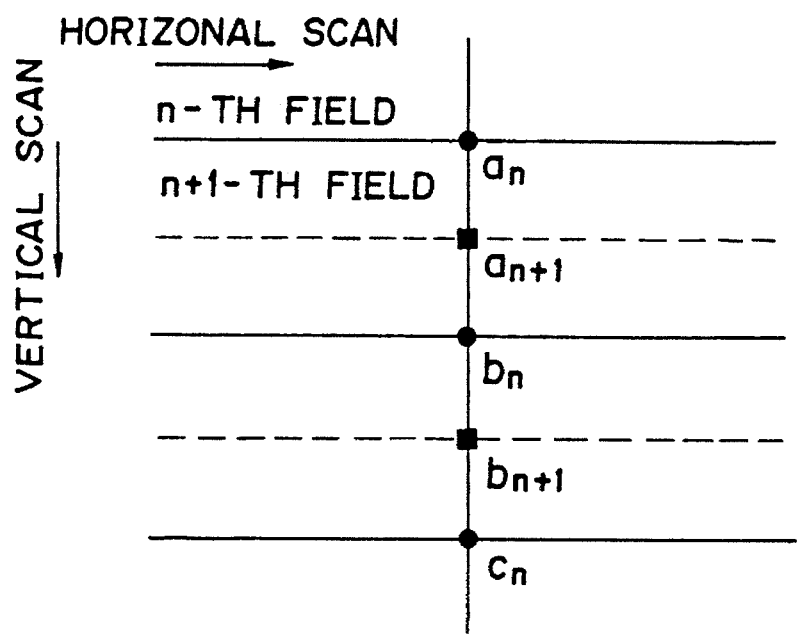
FIGS. 26(A) and 26(B) are illustrations for interpolation in another example of the third embodiment.
Figure 26B:
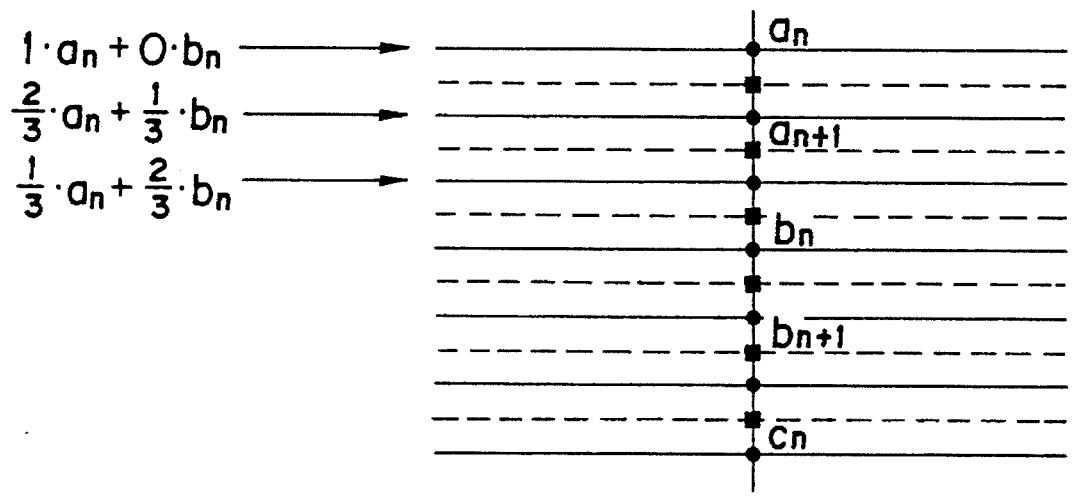

Then, description is made for other embodiments with reference to FIGS. 26A and 26B.

For instance, a principle of increasing scanning lines by 3 times is shown in FIG. 26. When linear input video signals specified by picture element signals $a_n$, $b_n$, $c_n$, ... $a_{n+1}$, $b_{n+1}$, $c_{n+1}$, ... on each field as shown in FIG. 26(A) input video signals are linearly interpolated by weighing picture element signals $a_n$ and $b_n$, $b_n$ and $c_n$, ... $a_{n+1}$ and $b_{n+1}$ and $c_{n+1}$ neighboring to each other according to prescribed ratios (1:0), (⅔:⅓), (⅓:⅔) . . . .

Thus, a video image with good resolution can be obtained by interpolating new picture elements between picture elements in each field.

In the embodiment, interpolation is made in the horizontal and vertical directions, but interpolation in only one direction may be made, and also interpolation can be made in reverse order.

Also in the interpolation, primarily interpolated luminance signals (or color signals), which are interpolated in the first stage of the circuit according to this invention are included in input video signals. However, it vertical interpolation coefficients are changed input video signals including only real luminance signals and real color signals output from output source can be entered.

Also, this embodiment can be applied to a multi-video image device comprising a plurality of display units. In this case, an optional section of an video image can be displayed keeping resolution of other sections which are not enlarged.

Thus, in the third embodiment, linear interpolation to obtain a density of picture elements suited to each magnification can be made by generating linear interpolation coefficients corresponding to magnification signals specifying enlarged display of input video signals at optional magnifications in at least one of horizontal or vertical directions, by weighing neighboring picture elements of each picture elements to be displayed in an enlarged form according to the linear interpolation coefficients, and interpolating new picture elements required for intervals between neighboring picture elements each different from each other, thus video images with good resolution being obtained.

Also, it is possible to prevent outlines of enlarged video images on several screens from becoming unclear, and outlines of all video images on all screens can be made clear.

What is claimed is:

1. A display control device to which a display format selecting signal to select a desired display format from a plurality of possible display formats is inputted, said device comprising:

a storage means in which video signals for original pictures are successively stored according to write signals for said original pictures and from which the stored video signals as input video signals are successively read according to display read signals;

a display means which comprises a plurality of display areas arranged in a matrix and provides video images according to video signals read from the storage means;

a video image position adjustment data storage means to store a plurality of video image position adjustment data including information indicating relative positional relations between the display areas corresponding to each possible display format for display in the plurality of display areas in said desired format, which is the same as or different from the display format of the original picture; and a video image position signal generating means to read video image position adjustment data corresponding to the inputted desired display format selecting signal from a plurality of video image position adjustment data corresponding to said plurality of possible display formats stored in the video image position adjustment data storage means and to perform fine adjustment of relative video image positions between the display areas adjacent to each other by generating the display read signals according to the read video image position adjustment data, whereby to permit display of one moving image over the plurality of display areas without a discontinuity at boundaries of the display areas.

2. The display control device of claim 1, wherein said device has a computing means to compute a timing signal, which becomes a reference for write sampling in the input video signal for an original picture, and said video image position signal generating means has an adjustment data read control means to read video image position adjustment data corresponding to a display format select signal from a plurality of video image position adjustment data stored in the video image position adjustment data storage means, and a comparing means to compare the read video image position adjustment data with a value computed by the computing means and generate a read signal for the display.

3. The display control device of claim 1, wherein the video image position adjustment data storage means stores a plurality of video image position adjustment data for at least one of horizontal and vertical directions in relation to a plurality of at least enlarged or minimized display format as the video image position adjustment data.

4. A display control device to which a magnification signal indicating a magnification of enlargement to be applied to an original picture is inputted, comprising:

a linear interpolation coefficient generating means to generate a variable linear interpolation coefficient linearly specifying a weight which is varied depending on the magnification indicated by the magnification signal, in interpolating a new picture element between particular picture elements specified by input video signals for the original picture, for each of picture elements adjacent to the new picture element to be interpolated;

a video signal processing means to linearly interpolate an input video signal according to the generated linearly interpolation coefficient and output an output video signal; and a display means to display the output video signal in a format which is the same as or different from the input video signal, said display means comprising a plurality of display areas arranged in a matrix, said linear interpolation coefficient generating means generating the linear interpolation coefficient to permit display of moving images with uniform resolution over the plurality of display areas.

5. The display control device of claim 4, wherein said video signal processing means is such that an input video signal is primarily interpolated in a first half stage of said video signal processing means in order to increase the number of scanning lines of the input video signal to have at least a real luminance signal, an interpolated luminance signal which is to be inputted between scanning lines in each field of the input video signal, and a real color signal, and each of these signals is linearly interposed according to the linear interpolation coefficients in the second half stage of said video signal processing means.

6. A display control device, to which a plurality of video signals are inputted, comprising:

a common bus means, including a plurality of parallel paths, for receiving and branching the inputted video signals and supplying all of the inputted video signals through each of said parallel paths, respectively;

an extraction means including a plurality of extraction units, each coupled to one of said parallel paths respectively, and each adapted to select and extract any from the video signals supplied through the respective parallel path;

an enlargement interpolating means including a plurality of enlargement interpolating units, each coupled to one of said extraction units respectively, and each adapted to enlarge and interpolate the respective extracted video signal in horizontal and vertical directions; and a display means including a plurality of display units, which display screens are arranged in a matrix, each of said display units coupled to one of said enlargement interpolating units respectively, for displaying one or a plurality of video images on said matrix of said display screens according to the enlarged and interpolated video signals, each extraction unit extracting the video signal corresponding to the position of the display unit in the matrix, which is connected thereto, whereby to permit display of one or more moving images over the plurality of display screens.

7. A display control device according to claim 6, wherein said extraction means is adapted to extract the video signals according to a video image select signal which indicates the portion of the video signals to be displayed on the display means.

8. A display control device according to claim 7, wherein each of said extraction unit includes:

a selector for selecting and extracting any from the supplied video signals according to the video image select signal; and a video image memory for storing 1 field or 1 frame of the selected video signal.

9. A display control device according to claim 6, wherein said enlargement interpolating means is adapted to enlarge the video signals according to a control signal which indicates the magnification of the video signals to be displayed on the display means.

10. A display control device according to claim 9, wherein said enlargement interpolating means is adapted to interpolate the video data in dependency on the magnification indicated by the control signal.

11. A display control device according to claim 6, wherein said enlargement interpolating means is adapted to enlarge the video signals by magnification in the horizontal direction different from that in the vertical direction.

12. A display control device according to claim 6, further comprising a position adjusting means for adjusting relative positions of the video images displayed on the display units to each other.

* * * * *